(12) United States Patent
Green et al.

(10) Patent No.: US 6,931,621 B2
(45) Date of Patent: Aug. 16, 2005

(54) METHOD AND SYSTEM AND ARTICLE OF MANUFACTURE FOR AN N-TIER SOFTWARE COMPONENT ARCHITECTURE OILFIELD MODEL

(75) Inventors: David W. Green, Richmond, TX (US); Kevin L. Banks, Austin, TX (US); John W. Kiowski, Jr., Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 767 days.

(21) Appl. No.: 09/746,362

(22) Filed: Dec. 22, 2000

(65) Prior Publication Data

US 2002/0038449 A1 Mar. 28, 2002

Related U.S. Application Data

(60) Provisional application No. 60/173,914, filed on Dec. 29, 1999.

(51) Int. Cl.[7] .................................................. G06F 9/44
(52) U.S. Cl. ...................... 717/100; 101/102; 101/106; 101/108; 101/116
(58) Field of Search ................................ 717/108, 116, 717/100–107, 110; 707/10; 719/320; 700/45; 702/13; 709/229

(56) References Cited

U.S. PATENT DOCUMENTS

| 4,828,028 | A | | 5/1989 | Soliman |
| 4,870,564 | A | * | 9/1989 | Ketelhut et al. ............... 710/12 |
| 4,916,617 | A | * | 4/1990 | Norwood ....................... 702/13 |
| 5,274,572 | A | | 12/1993 | O'Neill et al. |
| 5,303,582 | A | | 4/1994 | Miska |
| 5,457,797 | A | * | 10/1995 | Butterworth et al. ........ 719/320 |
| 5,466,157 | A | | 11/1995 | Henderson et al. |
| 5,504,672 | A | * | 4/1996 | Hardiman et al. ............. 700/45 |
| 5,815,717 | A | | 9/1998 | Stack ........................... 395/705 |
| 5,847,975 | A | | 12/1998 | Henderson et al. |
| 5,848,246 | A | | 12/1998 | Gish ....................... 395/200.58 |
| 5,857,197 | A | | 1/1999 | Mullins |
| 5,881,230 | A | | 3/1999 | Christensen et al. |
| 5,889,520 | A | * | 3/1999 | Glaser ......................... 345/853 |
| 5,889,942 | A | | 3/1999 | Orenshteyn |
| 5,978,582 | A | * | 11/1999 | McDonald et al. .......... 717/104 |
| 6,006,230 | A | * | 12/1999 | Ludwig et al. ................ 707/10 |
| 6,134,594 | A | * | 10/2000 | Helland et al. .............. 709/229 |

(Continued)

OTHER PUBLICATIONS

TITLE: Software Isn't Built from Lego Blocks, author: Ran, ACM, 1999.*

(Continued)

Primary Examiner—Chameli C. Das
(74) Attorney, Agent, or Firm—Cantor Colburn LLP

(57) ABSTRACT

A system and method for developing a software application for manipulating data associated with an asset are provided. The system includes at least one processing unit. The system further includes at least one memory store operatively connected to the processing unit. The system further includes an extensible N-tier software resident in and executable within the at least one processing unit, wherein N corresponds to a positive integer value. The system further includes an inventory of software components resident in the memory store wherein a plurality of tiers are generated from the inventory of a software components using the N-tier software, each tier being associated with at least one other tier, and each tier comprising a plurality of software components and performing a predetermined function relating to an asset.

13 Claims, 21 Drawing Sheets

U.S. PATENT DOCUMENTS

| | | | |
|---|---|---|---|
| 6,182,756 B1 | | 2/2001 | Garcia et al. |
| 6,202,200 B1 | * | 3/2001 | House et al. ............... 717/100 |
| 6,263,498 B1 | * | 7/2001 | Alcorn et al. ............... 717/110 |
| 6,266,666 B1 | * | 7/2001 | Ireland et al. ............... 707/10 |
| 6,272,673 B1 | * | 8/2001 | Dale et al. ............... 717/100 |
| 6,446,113 B1 | | 9/2002 | Ozzie et al. ............... 709/204 |

OTHER PUBLICATIONS

TITLE: Framework for Component–Based Client/Server Computing, author: Lewandowski, ACM, 1998.*

Fox, Otto; "Using BeanExtenders Dipping Technique"; Component Technology, IBM Software Solutions Divisions; Mar. 1998, pp. 1–8.

U.S. Appl. No. 09/746,155, entitled Method and System for Designing an N–Tier Architecture for Use in Generating Software Components filed Dec. 22, 2000.

Principles of Object Oriented Analysis and Design, Oct. 29, 1992, Chapters 1–22 and Appendix A, James Martin.

Object–Oriented Analysis and Simulation, Chapters 1–7 and Appendixes A and B, 1996, David R.C. Hill.

* cited by examiner ial U.S. national application, filed under 35 U.S.C. § 111(a), claims, under 37 C.F.R.§1.78(a)(3), the benefit of the filing date of provisional U.S. national application no. 60/173,914, filed on Dec. 29, 1999 under 35 U.S.C. § 111(b), the entirety of which is incorporated herein by reference. It has been proposed in co-pending U.S. patent application Ser. No. 09/746,155, filed on Dec. 22, 2000 with a U.S. Express Mail number of EL675616662US and incorporated herein by reference, to provide a system and method for software design of software architectures and, in particular, to provide for the design of a software component architecture for the development of extensible tier software component applications such as is used herein. It has been further proposed in co-pending U.S. patent application Ser. No. 09/746,362, filed on Dec. 22, 2000 with a U.S. Express Mail number of EL675616645US and incorporated herein by reference, to provide a system and method for development of software applications using software component architecture for the development of extensible n-tier software applications.

BACKGROUND OF THE INVENTION

1. Field of the Invention

The present invention relates to software applications having an extensible N-tier design and architecture and, in particular, to a new and improved method of software application creation for a software application adapted to model selected assets of a petroleum company such as an oilfield business model. By way of further particularity, to a new and improved method of software application creation for a software application adapted to an oilfield business model suitable for modeling exploration and production assets of a petroleum company and a system for such a method.

2. Description of the Related Art

A variety of techniques are used by a programmer or code developer to design or generate software program code. In one approach, software applications are designed as "monolithic" structures in which the various functions, such as data storage and application logic, are completely entwined. For example, given a set of system specifications and functions which are to be implemented by a given application or program, the code developer designs a monolithic, independently executable program which implements all the desired functions. The programmer may use, for example, a high-level programming language such as C++ and a code development tool to generate the high-level language, which is then compiled by a compiler to provide an executable version of the program.

One problem with this approach is that the applications are difficult to maintain, and separate functional portions of the program are difficult to reuse because all portions of the program are entwined and application-specific.

Accordingly, in the software field various software architectures have been developed in which application functionality is broken down into smaller units, such as objects or components. These units may be assembled to provide the overall functionality for a desired application. For example, a group of components may be assembled and compiled to provide a stand-alone, executable program. Alternatively, the components may be invoked and used in real-time, when the component's functionality is needed.

Because of the resource expenditure necessary to develop these units, it is desirable to be able to reuse these units, so that their functionality may be employed in subsequent applications without having to "re-invent the wheel" each time this functionality is needed. In current software architectures, such as two-tier and three-tier architectures, some portions, such as data repositories and user interfaces, are relatively easy to reuse. However, other types of components, such as those implementing application logic, are still clumped in large blocks, making reuse of these components or their various functions difficult. This is especially true for oil field software applications.

There is a need, therefore, for an improved software application suitable for manipulating oil fields and their components that avoid the drawbacks of the prior art.

DETAILED DESCRIPTION

Figure 1:
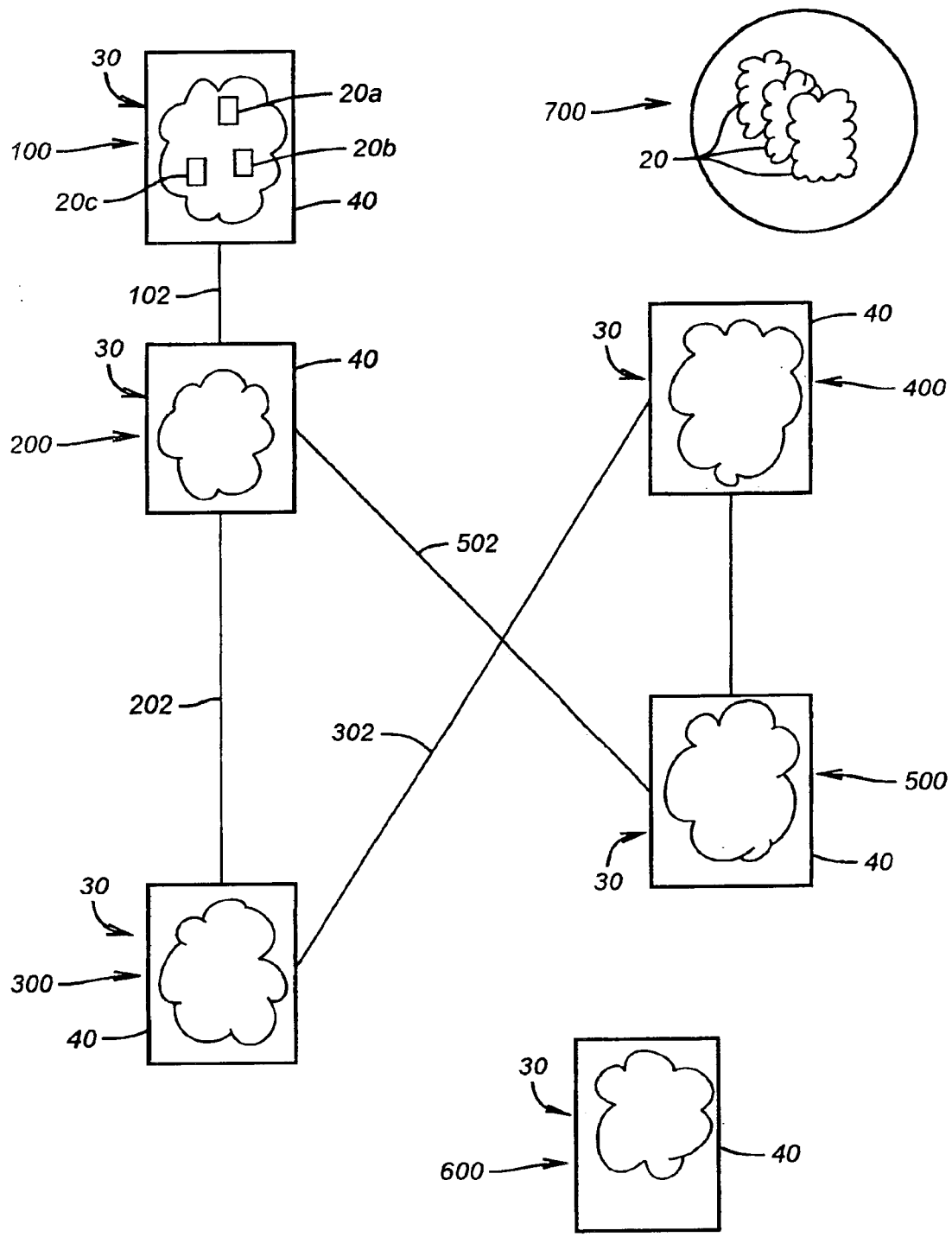
FIG. 1 is a diagrammatic representation of the present invention's "N-tier architecture" paradigm.

Referring generally to FIG. 1 through FIG. 6, the present invention comprises a methodology that applies an engineering and manufacturing oriented approach to software production based on a well-defined architecture. As used herein, "manufacturing" implies a method analogous to a software factory. Using the present invention methodology, software application development can proceed as if it was a software manufacturing process with an assembly line capable of assembling all types of intellectual property quickly and at the lowest cost.

It has been proposed in co-pending U.S. patent application Ser. No. 09/746,155 attorney docket no. D5407-00109, filed on Dec. 22, 2000 with a U.S. Express Mail number of EL675616662US and incorporated herein by reference, to provide a system and method for software design of software architectures and, in particular, to provide for the design of a software component architecture for the development of extensible tier software component applications such as is used herein. Utilizing that system and method, it has been further proposed in co-pending U.S. patent application Ser. No. 09/746,362, attorney docket no. D5407-00123, filed on Dec. 22, 2000 with a U.S. Express Mail number of EL675616645US and incorporated herein by reference, to provide a system and method for development of software applications using the software component architecture for the development of extensible n-tier software applications.

The present invention uses an "N-tier architecture" paradigm as described in co-pending U.S. patent application Ser. No. 09/746,155, and co-pending U.S. patent application Ser. No. 09/746,362. In an N-tier architecture, all functionality is broken down at the system level into logical chunks or tiers 30 that perform a well-defined business function. In the present invention's N-tier architecture there is no limit to the number of tiers 30.

The present invention's N-tier software design architecture is employed to develop software components 20. As those of ordinary skill in the programming arts will appreciate, "software components" are language independent and may be implemented in any of a number of computer languages including without limitation FORTRAN, C, C++, JAVA, assembler, or the like or any combination thereof. As those of ordinary skill in the programming arts will appreciate, "N-tier" in the prior art may be thought of as implying a hierarchy such as with protocol stacks. However, as used herein, "N-tier" describes an architecture that is characterized by a plurality of "N" tiers 30, each of which has a specified type and a specified interface. Although a hierarchy can be defined for the tiers 30, no one hierarchy is mandatory in the N-tier architecture of the present invention.

Each software component 20 to be developed is associated with at least one tier 30, depending upon the nature of the functions to be performed by that software component 20 and tier 30. The present invention specifies a method and a system for using architectures to implement a N-tier system wherein a software component designer can design or select each software component 20 to perform specified functionality and ensure that each software component 20 has the interfaces specified by the architecture for that tier 30.

Using the methodology of the present invention, there is no limit to the number of tiers 30 or software components 20 that can be implemented or defined. Rules for the architecture are used whereby tiers 30 are not necessarily part of a hierarchy as in two- or three-tier systems, but are logically interconnected using specified interfaces so that each tier 30 can interact with one or more other tiers 30 as needed, i.e., a software component 20 within a given tier 30 can interact with software components 20 of one or more other tiers 30 as necessary.

The following terms are understood to have the following meanings to those of ordinary skill in the software programming arts for the present invention, and some are further explained herein:

| TERM | DEFINTION |
| --- | --- |
| Architecture | A set of design principles and rules used to create a design. |
| COM | Component Object Modeling. |
| Component | An object that encapsulates, or hides, the details of how its functionality is implemented and has a well-defined interface reusable at a binary level. |
| CORBA | Common Object Request Broker Architecture |
| DCOM | Distributed Component Object Model |
| DLL | Dynamic Link Library |
| eventhandler | message handling object |
| Framework | An architected context for business objects that modify the business objects' attributes or add new behavior. |
| GUID | Globally unique identifier, e.g. a number having a predetermined number of bits that uniquely identifies a software component |
| JAVA | a programming language |
| Model | A heterogeneous collection of components whose relationships are enforced via a predetermined set of rules; a collection or instantiation of software components where the collection or instantiation may be organized into a hierarchy |
| Object | A programming structure encapsulating both data and functionality that are defined and allocated as a single unit and for which the only public access is through the programming structure's interfaces. A COM object must support, at a minimum, the IUnknown interface, which maintains the object's existence while it is being used and provides access to the object's other interfaces. |
| Package | A logical grouping of interfaces within a framework that provide a specific behavior such as messaging or connecting. |
| Sink | Connection sink for messaging. |
| Source | Connection source for messaging |
| Tier | A logical grouping of components that perform a well-defined, predetermined function. |

As further used herein, "manipulates" is meant to be read in an inclusive manner to include a software application that passively models, actively models, or performs a combination of active and passive modeling. Further, a software application that "manipulates" also includes software applications that perform data processing, data acquisition, and supervisory control functions as those terms are understood by those of ordinary skill in the software programming arts.

Frameworks 40 specify a basic design structure for a tier 30, including software components 20 and a set of standard interfaces for any software component 20 categorized as belonging to that tier 30. As indicated in FIG. 1 through FIG. 21, frameworks 40, shown generally as boxes, comprise one or more packages 42, shown generally as circles in the various figures; one or more representative interfaces, where the interfaces are shown generally as clouds in the various figures; and one or more methods for collecting software components 20 as well as one or more interrogatable properties and variables. A package 42 is thus a collection of interfaces that provide a specific behavior, such as messaging or connecting. Most frameworks 40 in the present invention comprise more than one package 42.

In object oriented software programming arts, methods and properties are often referred to as attributes, but frameworks 40, packages 42, and interfaces are not limited to object oriented programming constructs. As used herein, "methods" are meant to mean software that exhibits a behavior and "properties" are meant to mean variables and constants exposed to other interfaces.

As further used herein, a "collection" or "software collection" is a software construct that provides an interface that allows access to a group of data items, whether raw data or other software components 20. An interface that follows the standards for providing access to a group of objects is referred to herein as a "collection interface." By way of example and not limitation, a collection interface provides programmatic access to a single item in the collection such as by a particular method, e.g. an "Item( )" method. By way of further example and not limitation, a collection interface lets "clients," as that term is understood by those of ordinary skill in the software programming arts, discover characteristics, e.g. how many items are in the collection, via a property, e.g. a "Count" property.

Throughout this document, references to different kinds of software components 20 will use the following naming conventions:

TABLE 1

Standard Abbreviations

| Abbreviation | Definition |
|---|---|
| GC | Class |
| GP | Package |
| IGC | Interface to Class |

Thus, within this specification an entity, construct, or named example such as "GCxxx" implies that "GCxxx" may be implemented as a class as that term is understood by those of ordinary skill in the software programming arts. An entity, construct, or named example such as "IGCxxx" implies that "IGCxxx" is an interface to a class as that term is understood by those of ordinary skill in the software programming arts. An entity, construct, or named example such as "GPxxx" implies that "GPxxx" is a package 42. This terms and naming conventions are meant to be illustrative and are not meant to be limiting as software components 20 may be implemented in other than software that uses the notion of "class," e.g. other than object oriented programming languages.

In addition, software components 20 may comprise properties or attributes. As used herein, a property indicated with a name having a trailing set of parentheses "( )" is to be understood to be an invocable method, whereas a property indicated with a name without a trailing set of parentheses "( )" is to be understood to be a variable or other datum point. By way of example and not limitation, those of ordinary skill in the programming arts will understand that an object or software component 20 named "foo" may have a method "add( )" invocable by "foo.add( )" and a property "grex" accessible by "foo.grex" or in similar manner. As will be readily understood by those skilled in the software programming arts, two or more software components 20 may have identically named methods or properties, but each represents a unique and distinct method or property. For example, an interface "IGOne" may have a property "x" as may an interface "IGTwo," but IGOne.x is not the same as IGTwo.x. Similarly, IGOne.foo( ) is not the same as IGTwo.foo( ).

It is understood that these descriptive constructs are not limitations of the present invention, the scope of which is as set forth in the claims, but are rather meant to help one of ordinary skill in the software programming arts more readily understand the present invention. In addition, more information on these functions and naming conventions, and on software components and COM objects in general, can be found in the MSDN (Microsoft Developer's Network) Library (January 1999), published by Microsoft Press and incorporated herein by reference.

It is further understood that, as used herein, "software components," generally referred to by the numeral "20," include objects such as are used in object oriented programming, as these terms are readily understood by those of ordinary skill in the software programming arts, but are not limited to objects. Instead, software components 20 may further comprise any invocable software including runtime libraries, dynamic link libraries, protocol handlers, system services, class libraries, third party software components and libraries, and the like, or any combination thereof.

A given N-tier application may be designed using the principles, rules, and methods of the present invention to satisfy the needs and characteristics of a given industry. As used herein, "application" is understood to include compiled, interpreted, and on-the-fly applications, such as, by way of example and not limitation, CORBA, just-in-time, JAVA, and the like, or any combination thereof, as these terms are understood by those of ordinary skill in the software programming arts. A "wizard" or other code development tool may also be used which allows the code developer to generate software components 20 within the specifications of the particular N-tier architecture. For example, the wizard may permit the code designer to generate a software component 20 by selecting the tier 30 for the software component 20 and ensuring that the software component 20 is in compliance with the interface standards designated for software components 20 of that particular tier 30.

An N-tier application defined and implemented using the present invention may be thus adapted for use in numerous industries and contexts, for example ship-building arts, financial arts, or medical arts as well as geological industry arts.

Referring now generally to FIG. 1 through FIG. 21, an N-tier application of the present invention is designed using an extensible N-tier architecture developed using a methodology for specifying rules and methods that enable applications to be constructed. Such a methodology has been proposed in co-pending U.S. patent application Ser. No. 09/746,155.

Such applications have functionality broken down at the system level into logical chunks or tiers 30 that perform a well-defined function, such as a business function, according to rules for the selected architecture. In a currently preferred embodiment, each tier 30 logically groups together software components 20 that have a similar or complementary type of behavior.

As discussed herein below, framework 40 specifies a basic design paradigm for a tier 30, including a base set of software components 20 and a set of standard interfaces for any software component 20 categorized as belonging to that tier 30. Frameworks 40 may comprise a plurality of packages 42.

The present invention uses predetermined rules to allow new software components 20 to be created or purchased and then possibly added to an inventory (or catalog) 700 of components for future reuse in subsequent applications. As more software components 20 are developed, inventory 700 grows, thus further reducing the time and resources needed to develop new applications. Further, software components 20 are available for use by any other software component 20 that can use its interface, including off-the-shelf components. Off-the-shelf components, e.g. purchased components, may be incorporated into the N-tier application of the present invention such as by adding a predetermined interface to that off-the-shelf component as required by the N-tier architecture of the present invention.

The present invention also uses predetermined rules to allow a given N-tier application to be extended, for example by adding a new tier 30 to result in a new, N+1-tier application. Many software components 20 developed for the predecessor N-tier application will be immediately reusable in the incremental, N+1-tier application and others will be reusable with relatively minor modifications.

Each tier 30 defined and implemented using the present invention specifies the types of interfaces that software components 20 associated with that tier 30 must have. These interfaces are thus standardized interfaces for that N-tier architecture that allow software components 20 of a type of tier 30 to be accessed by other software components 20 in other tiers 30. A software component designer using the present invention uses the rules for building software components 20 with the knowledge of or ability to access other software components 20, based on the interface specified by tier 30 for these types of software components 20.

In one embodiment, the present invention uses predetermined rules to define and create a particular N-tier application with a specified, initial number and type of tiers 30 and with a specified interface architecture for each tier 30, where each initial tier 30 satisfies one of a major portion of system functionality, such as business logic processing, data processing, and the like.

Each tier 30 will tend to have a unique set of interfaces, depending on the nature of the types of software components 20 grouped under that tier 30. More common interfaces may include a specific, common first interface to allow a software component's 20 dependencies to be collected by that software component 20 and accessed by other components; and a specific, common second interface to allow a software component 20 to be identified at run time by another component.

In an embodiment, the N-tier application of the present invention may utilize an asynchronous architecture paradigm permitting software components 20 to engage in asynchronous communication via asynchronous messaging. In other embodiment, synchronous or mixed synchronous and asynchronous messaging may be present.

In a currently preferred embodiment, software component 20 interfaces are implemented using Microsoft's COM specification for its WINDOWS (R) operating system environment. See, e.g., ESSENTIAL COM by Don Box, published by ADDISON WESLEY LONGMAN, INC., 1998 with ISBN Number 0-201-63446-5. Only a software component's 20 external interfaces are seen by the outside world. Common interaction standards, such as ActiveX, may be used to facilitate communication between software components 20 and reduce the need for connective software between software components 20. Services provided by software components 20 may then be networked together to support one or more desired processes. These services can be reused and shared by other software components 20. However, it will be apparent to those of ordinary skill in the programming arts that software components 20 may be constructed using numerous other environmental paradigms, by way of example and not limitation including those required by LINUX, SUN (R) SOLARIS (R), Unix, or the like, or any combination thereof.

As currently contemplated, some tiers 30 may exist that are not true tiers 30, i.e. they do not exist to provide additional behavior to software components 20. These tiers 30, such as Wizard, Testing, or Template tiers 30, shown generally in FIG. 1 as tier 600, may be present to provide additional auxiliary functionality. By way of example and not limitation, Wizard tier 30 may exist to provide a set of interactive help utilities that assists developers in quickly creating standard present invention components. Testing tier 30 may be present to contain software components 20 that exercise software components 20 or packages 42 from the functional tiers 30, record test results in a log, and notify developers of the test completion status. Software components 20 in Template tier 30 may provide C++ implementation of persistence, collections, and iterators for standard present invention software components.

Figure 2:
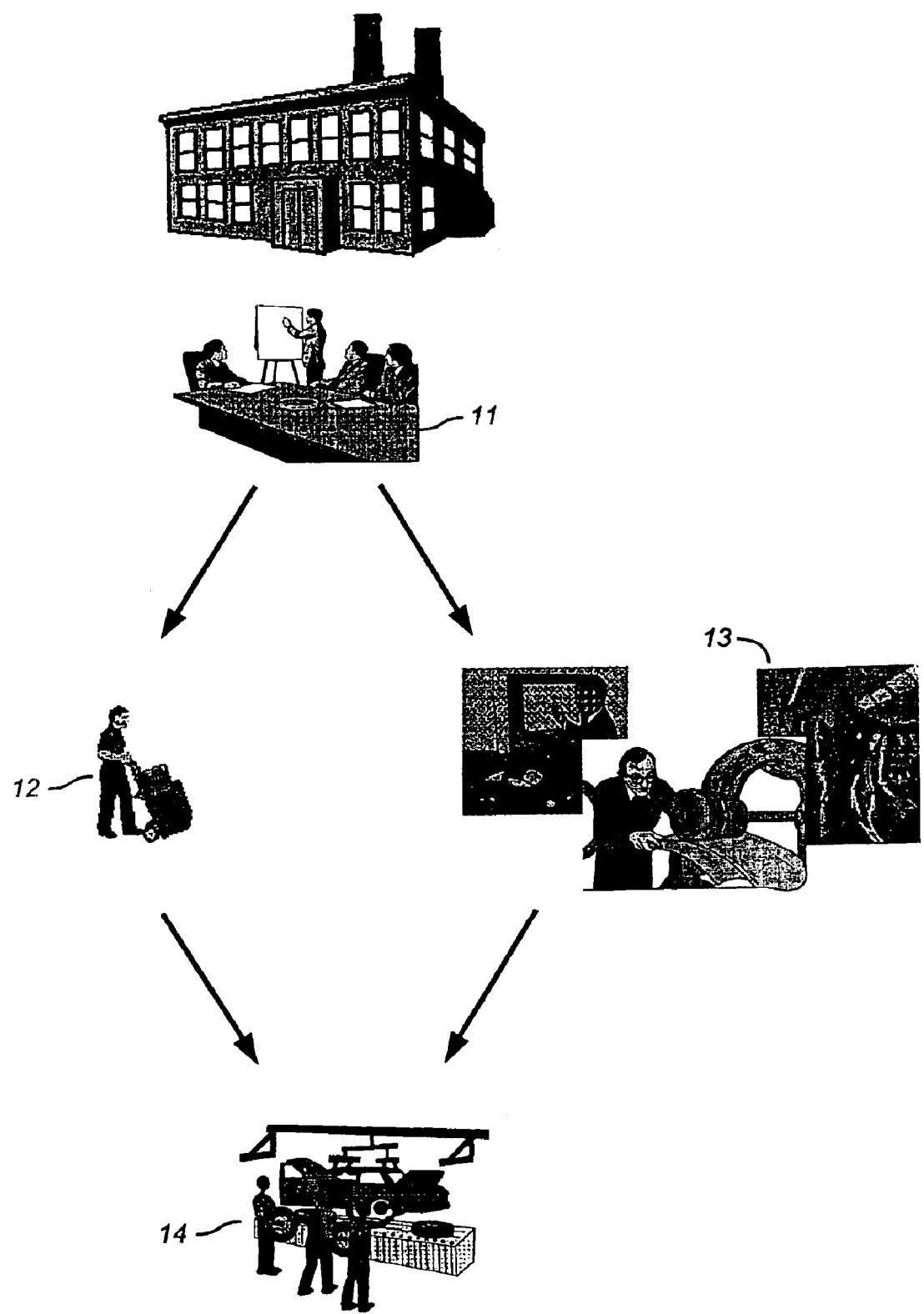
FIG. 2 is a pictographic representation of a software factory.
Figure 3:
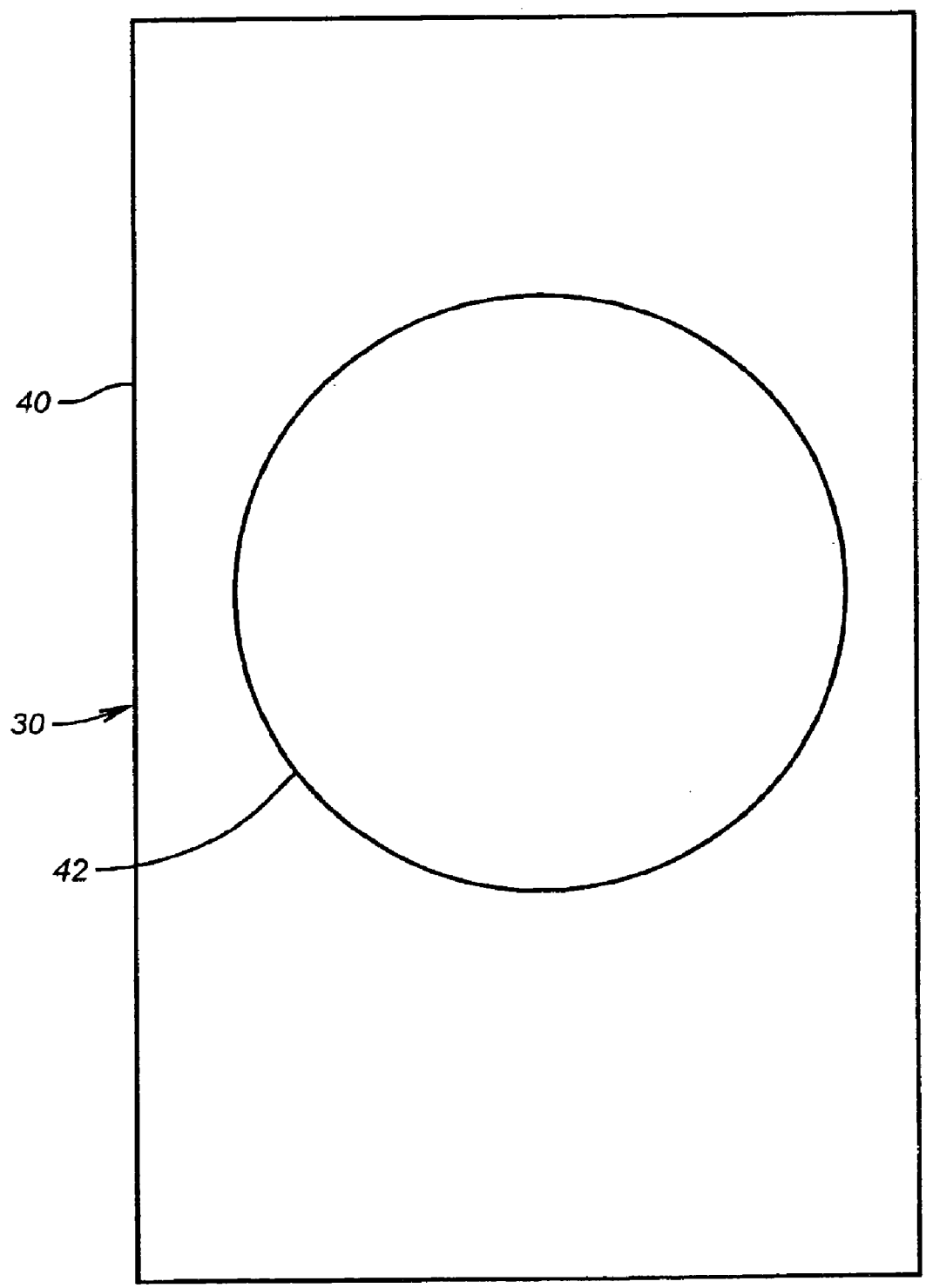
FIG. 3 is a diagrammatic representation of a tier and its framework.
Figure 4:
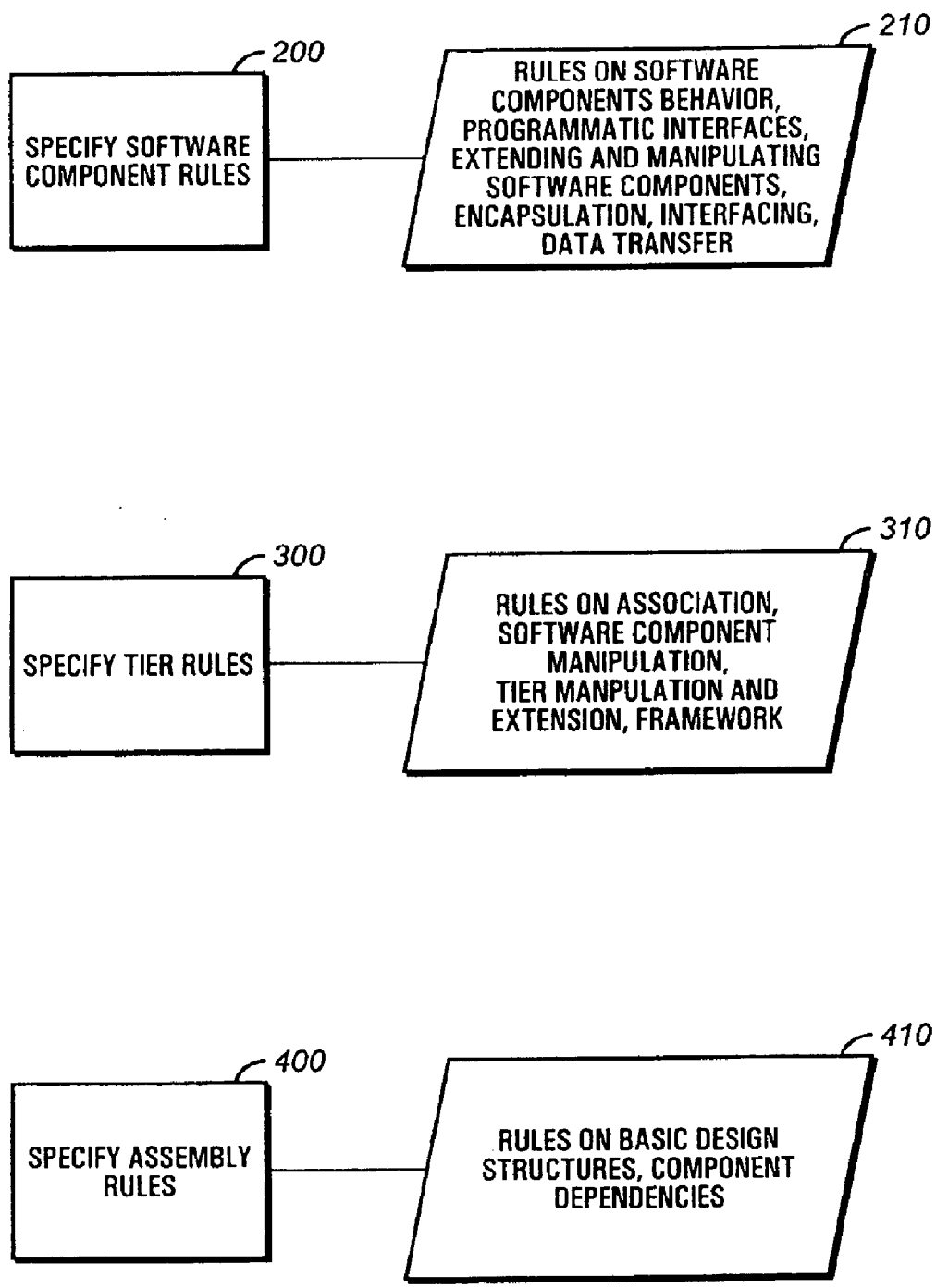
FIG. 4 is a diagrammatic representation of the present invention's methodology.

Referring now to FIG. 2, a pictographic representation of a software factory, software components 20, whether purchased or created, may be placed into inventory 700 for future use using library or cataloging processes, all of which are familiar to those of ordinary skill in the programming arts. Software component 20 interfaces are standardized, with software component 20 functionality limited to the characteristics and behavior unique to the software components they represent. The paradigm for the present invention is a software application assembly line as if in a software application factory. As shown at 11, application requirements are first determined. The existing inventory 700 is then reviewed 12 for software components 20 that fit the new application requirements. System requirements that do not exist as stock software components 20 are created 13 or possibly purchased and possibly added to inventory 700. A new application may then be created 14 from the stock software components 20 and the new software components 20. The application may be created by combining software components 20 at run-time to form new unique applications on-the-fly, and making software reuse a practical reality.

Figure 5:
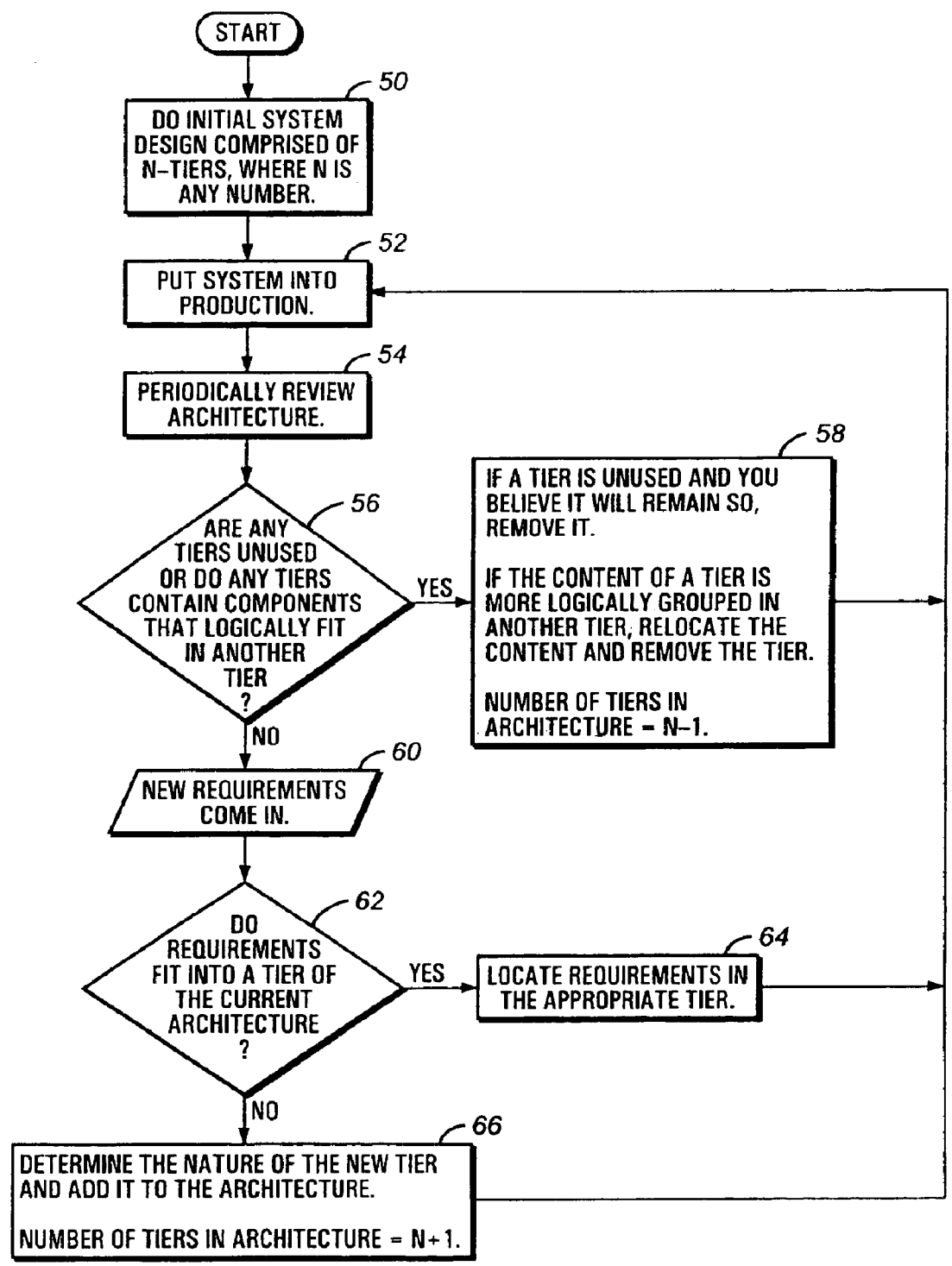
FIG. 5 is a flowchart representation of the present invention's life cycle rules.

Referring now to FIG. 5, a life cycle flowchart, the present invention's methodology allows application development to drive changes to the present invention's architecture using a set of life cycle rules. By way of example and not limitation, rules that define that software architecture are either designed anew, selected from a preexisting set of rules, or any combination thereof. Thus, a software application designed using the present invention's method generates software components 20, tiers 30, and applications by using software component rules 210, tier rules 310, and assembly rules 410 for an initial design 50. The initial design may have a predetermined number of initial tiers 30.

The system implemented is put into production 52 and periodically reviewed for adjustments that may be necessary 54. If any tier 30 is determined to be in need of adjustment 56, it can be removed or otherwise modified 58. As additional requirements arise 60, new software components 20 are created, existing software components 20 modified 62, 64, or a combination thereof. Tiers 30 may be added, modified, or deleted 66 as application requirements dictate.

Figure 6:
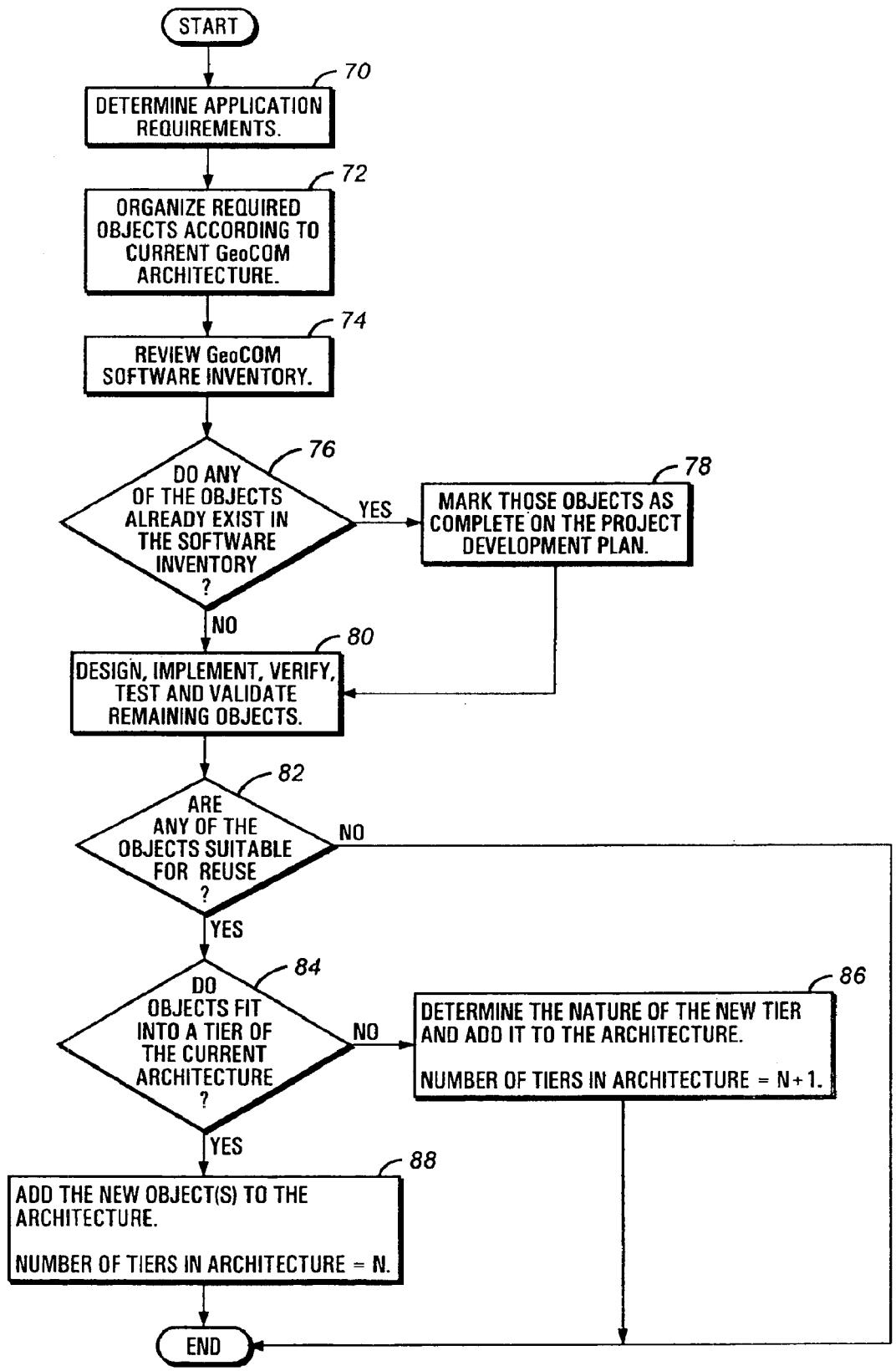
FIG. 6 is a flowchart generally describing the present invention's method for designing a software architecture for use in generating software components.

Referring now to FIG. 6, once a list of required models 31 and software components 20 is determined 70, software components 20 are logically grouped 72. A determination 74, 76 is then made to determine if any of the needed software components 20 already exist in inventory 700. Whenever possible, software components 20 are reused 78 from inventory 700. Software components 20 that do not fit the current architecture may be restructured to ensure conformance while retaining the original intent of the requirement.

Additional software components 20 may be created or purchased 80 as needed after review of specifications and current inventory 700.

Using the predetermined rules and design methods of the present invention, software components 20 are designed and implemented as needed for a given functionality. By way of example and not limitation, business software components 20 may be defined and implemented where each business software component 20 encapsulates information about a real-world object or process, such as a well, a geological feature under the earth (e.g. a fault), a logging truck or tool, or information about a job that has been run. Visual software components 20 may be defined and implemented to encapsulate presentation information. By way of further example and not limitation, data software components 20 may also be defined and implemented as a software component 20 that preserves the state of a business software component 20 and allows data within a business software component 20 to be accessed and used. For example, a data software component 20 may extract data from a given business software component 20 and store it in a database.

After new or modified software components 20 successfully pass a testing and validation phase, new or modified software components 20 are assessed for suitability 82 to become part of inventory 700. Software components 20 that have potential for reuse are added 88 to inventory 700. These new or modified software components 20 may thus be integrated into a current architecture, expanding the current architecture, i.e., adding 86 one or more tiers 30 to accommodate them. By definition via the rigid implementation of standard interfaces, a software component 20 from one tier 30 can be used by any software component 20 from any other tier, making tier 30 relationships of little importance. However, in practice it is likely that certain software components 20 will primarily be used by certain other software components 20.

As illustrated in FIG. 1, each of present invention's tiers 30 may interface with one or more other tiers 30 using an interface mechanism as further described and claimed herein. By way of example and not limitation, in one embodiment of the present invention, the present invention's design methodology specifies a predetermined, initial number of tiers 30 comprising Base tier 1000. Base tier 1000 software components 20 may then be used to create software components 20 and other tiers 30, by way of example and not limitation such as Messaging tier 2000, Business Object tier 3000, Real-Time Device tier 4000, Data tier 5000, Processing tier 6000, Visual tier 7000, Template tier 8000, Business Rules tier 9000, Wizards tier 10000, Testing tier 11000, Interceptor tier 12000, and Application tier 13000. Other tiers 30 may also be created, such as by way of example and not limitation Plotting tier 30.

Figure 7:
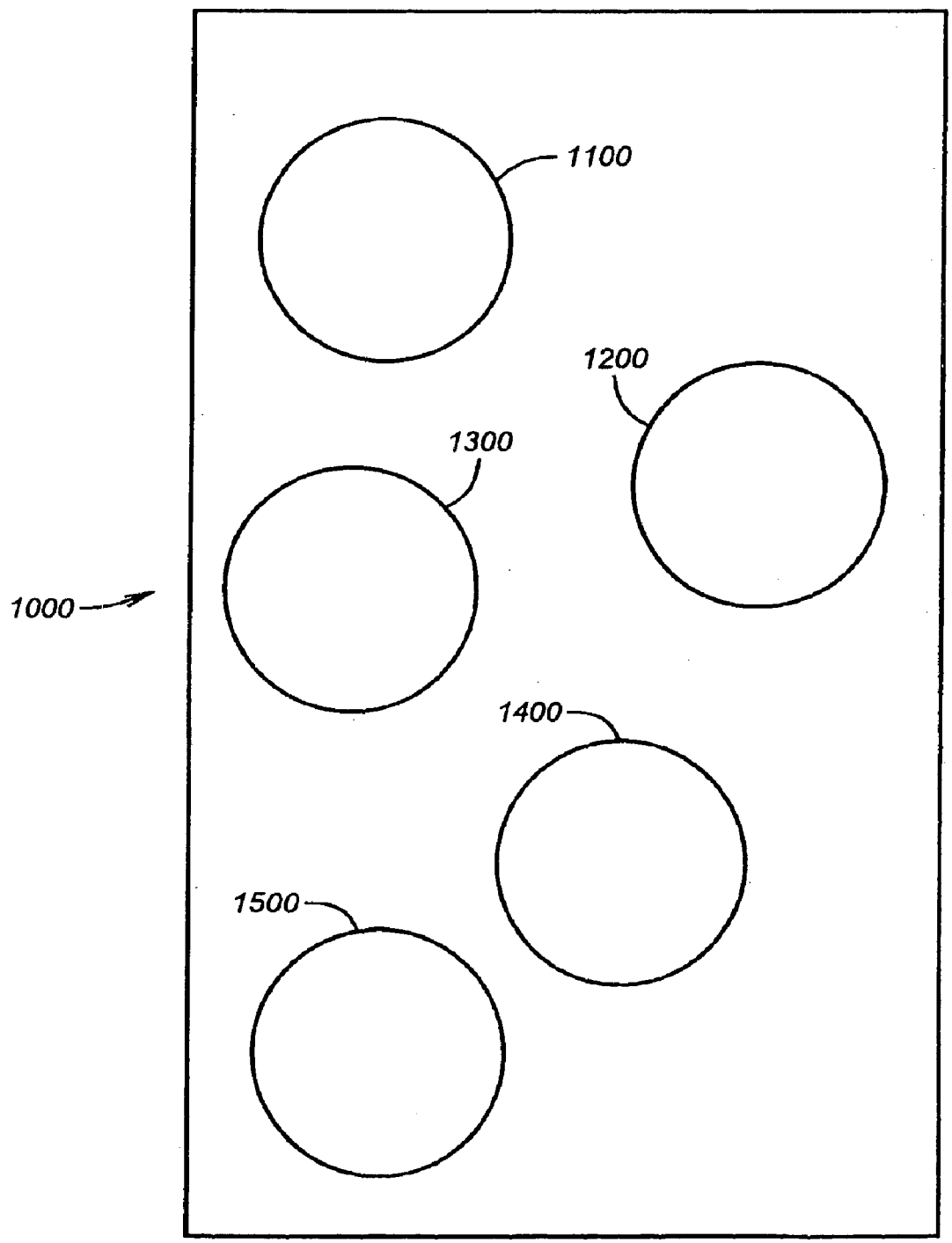
FIG. 7, a Venn-type diagram of the present invention's Base Tier.
Figure 8:
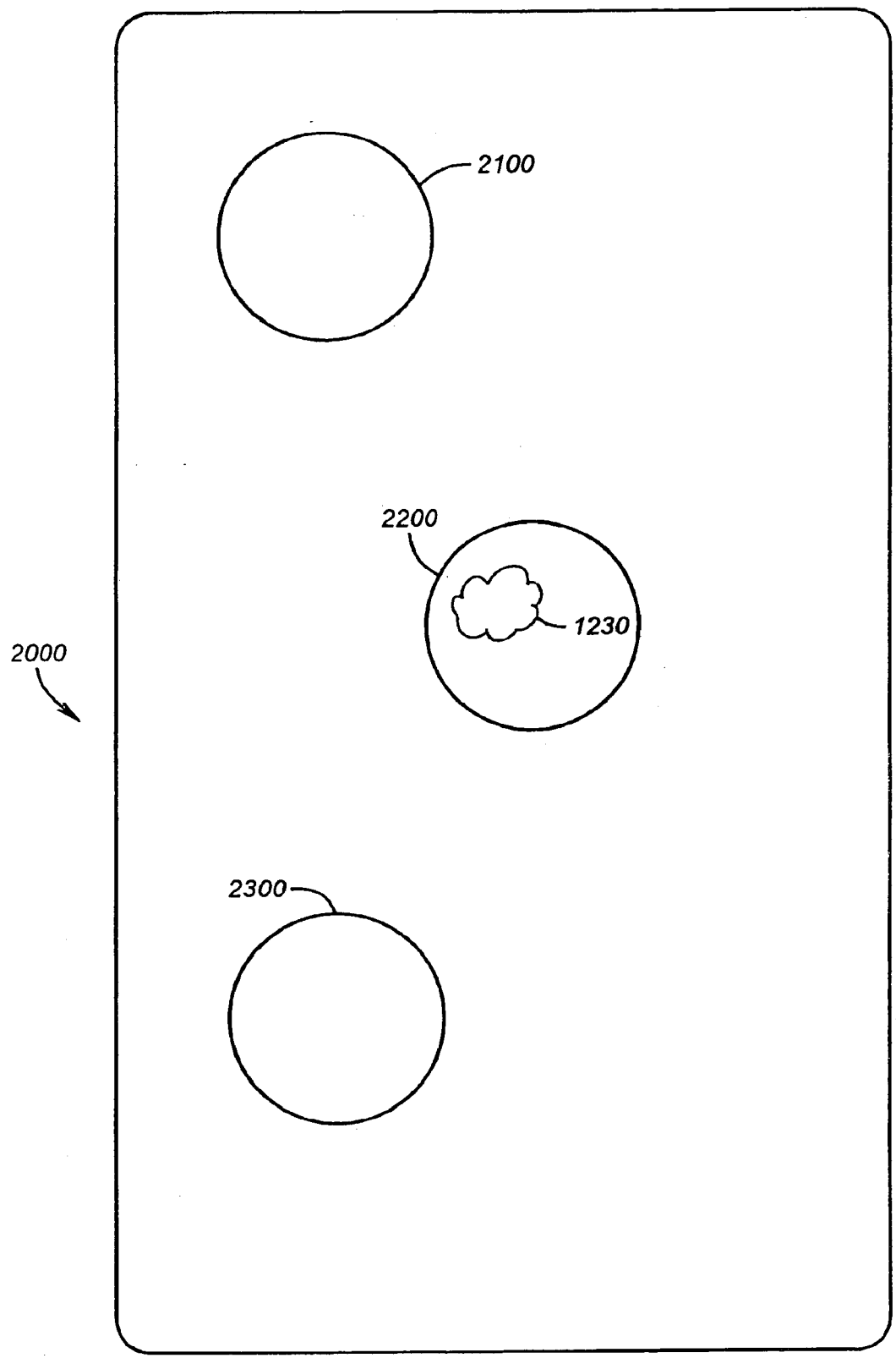
FIG. 8, a Venn-type diagram of the present invention's Messaging Tier.

Referring now to FIG. 7, Base tier 1000 may be present to provide initial, basic mechanisms for implementing an application. In a preferred embodiment, Base tier 1000 software components 20 form tailorable, initial building blocks for other software components 20 and other tiers 30.

Base tier 1000 comprises GPCollection 1100, which provides a method for collecting software components 20; GPBase 1200, which contains several software components which are normally aggregated into other software components 20; GPConnection 1300, which provides methods for connecting software components 20 as sources or sinks of information, where source and sink have the meanings as described herein below; GPEventHandler 1400, which provides the message-based, asynchronous behavior; and GPDevice 1500, which provides methods for controlling devices.

GPCollection 1100 allows accessing a group of data items, e.g. a set of oil well data curves. In a preferred embodiment, GPCollection 1100 comprises methods that enable access to and maintenance of a data set and is an implementation of a COM collection interface, including determining the number of and allowing iteration through software components 20 in a collection.

GPBase 1200 supports software components 20 that are used by most other software components 20, for example, to get or set the time and date as well as assignment of a predetermined category characteristic to a software component 20. The category characteristic property may allow getting or setting descriptive information about a software component 20, including the registered number (CLSID) of software component 20 and a "type characteristic" of a software component 20 where type characteristics may be different for different software components 20 and where type characteristics are predefined or programmatically defined. For example, "business" software components 20 might have a type of "curve" or "well," and "data" software components 20 might have a type of "curve" or "parameter."

GPConnection 1300 comprises one or more interfaces to enable sending and receiving events or information to another software component 20. In the preferred embodiment, a designer must aggregate a connection source interface into any software component 20 that needs to send events or information to another software component 20, e.g. a message, or that needs to support sink interfaces.

GPEventHandler 1400 executes previously registered callbacks between a framework 40 and applications built on top of the framework 40. GPEventHandler 1400 comprises interfaces that support event processing, including event-handling services capable of handling synchronous or asynchronous events, thread pool services to manipulate and maintain a pre-set number of threads; and methods to provide callback processing on an event and to track which callbacks are registered to handle which message types.

GPDevice 1500 allows communication with hardware devices. GPDevice 1500 comprises interfaces to provide for communication to and from hardware devices as well as interfaces to let an event handler send information or events back to a device.

Figure 9:
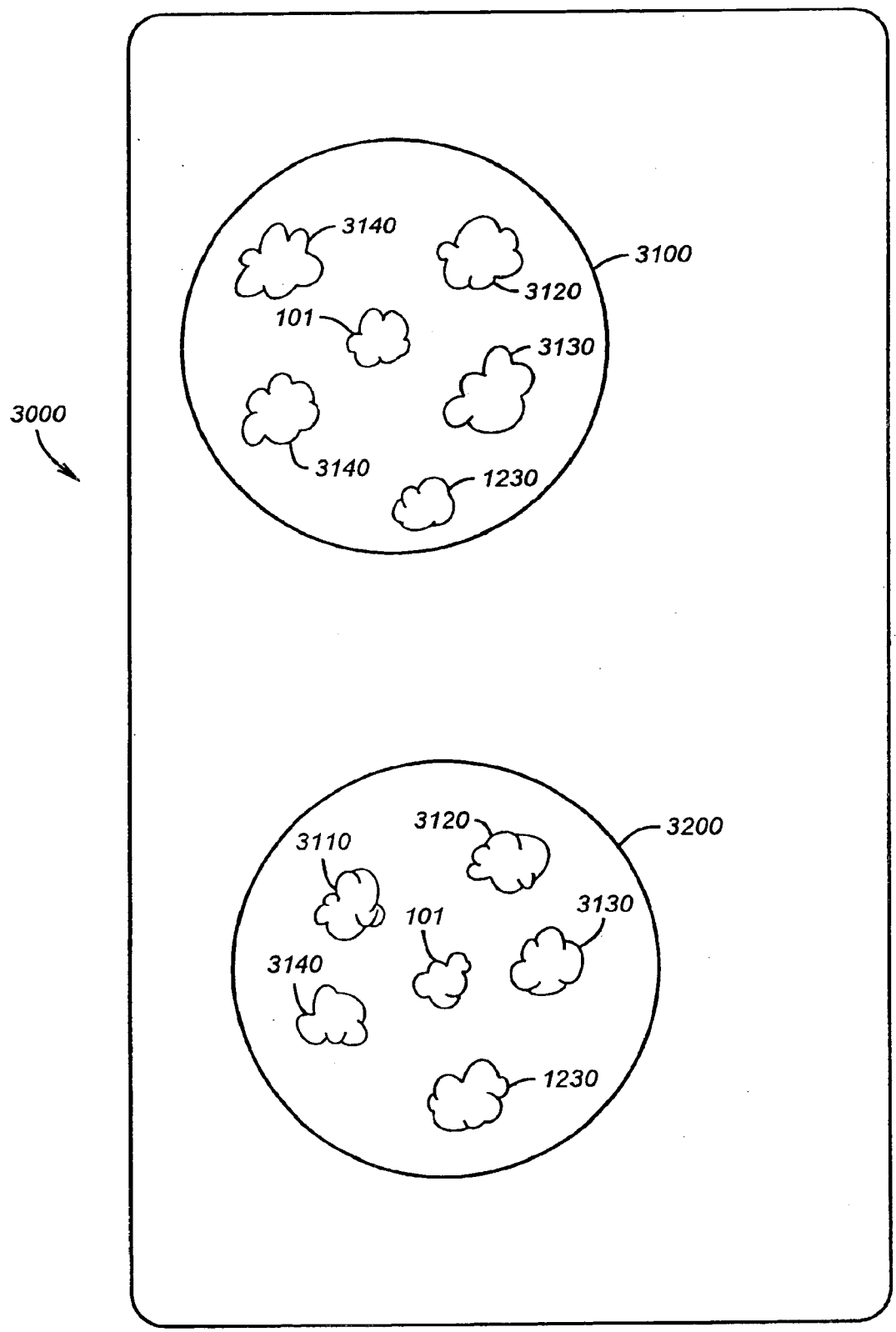
FIG. 9, a Venn-type diagram of the present invention's business software components.

Referring now to FIG. 9, in a preferred embodiment, Business Object tier 3000 specifies base interfaces used to create business software components 20. In the preferred embodiment, business software components 20 provide storage for and access to information, encapsulating the attributes and methods of a common business entity, such as a well, log, sensor, or bed.

Thus, a business software component 20 may represent real-world business data, such as a well, log, gamma ray measurement, resistivity measurement, job, run, pass, sensor, STAR tool, fracture, fault, bed, bedding surface, or borehole. Business software components 20 contain many attributes and methods used to access the data but contain little additional behavior.

Rather than try to model all the possible associations of business software components 20 and create a static business software component model 31, in the preferred embodiment business software components 20 have a generalized collection interface used to collect other business software components 20. Valid types of business software components 20 that can be collected by (or associated with) other business software components 20 are defined external to the business software components 20 in Business Rules tier 9000. This allows business software components 20 to be maintained separately from the rules defining their relationships. This also lets the relationships change without changing business software components 20.

By building meaningful associations of business software components 20, software components 20 model real-world business needs. Using business software components 20 as "black-box" data containers, software components 20 can implement additional behavior to visually render, analyze, or modify model 31.

Figure 10:
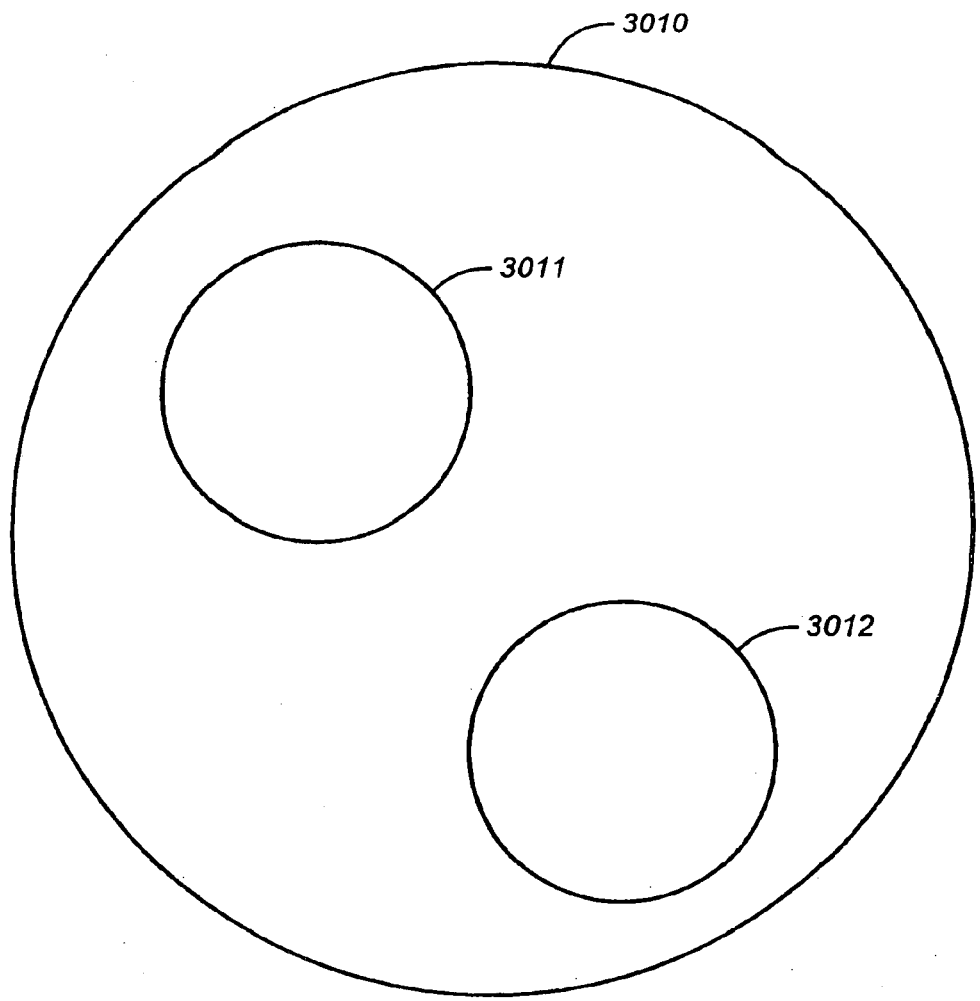
FIG. 10, a Venn-type diagram of composite components.

Referring now to FIG. 10, composition software components, some business software components 20 may be "compositions," business software components 20 that have attributes that are other business software components 20. In the case of compositions, a composite business software component 20 is static—the relationship between business software component 20 and the attribute software component 20 is not an association enforced by business rules. Compositions may be used when there is a "whole-to-part" relationship between software components 20; by way of example and not limitation, in an exemplary embodiment for an oil well, composite business software component 20 GCBed 3010 comprises a top GCBeddingSurface 3011 and bottom GCBeddingSurface 3012. These surface software components 20 are a critical part of GCBed 3010 in that GCBed 3010 cannot accurately be defined without them. Therefore, GCBed 3010 is a composite business software component 20 further comprising two attributes, GCBeddingSurfaces 3011, which are themselves business software components 20. Methods may then be provided on a business software component 20 to access the composite business software components 20.

Composite business software components 20 are not created when a new business software component 20 is created. It is therefore the responsibility of the system designer to create any business software components 20 that comprise each composite business software component 20 and set them into the composite software component 20. In the preferred embodiment, when business software components 20 are retrieved from a persistent store, composite business software components 20 are automatically retrieved.

Referring back to FIG. 9, Business Object tier 3000 software components are easily extensible. Because business software components 20 are COM components designed to have no dependencies, new attributes and behavior can readily be added to one business software component 20 or to all business software components 20 with little or no modification to existing code.

In a preferred embodiment, Business Object tier 3000 comprises: GPModel 3100, allowing collection of a group of related business software components 20 into a real-world business entity called a model; and GPBLOB 3200, allowing storage of large amounts of binary data in a business software component 20.

GPModel 3100 comprises a set of interfaces that business software components 20 aggregate to achieve specific functionality.

GPBLOB 3200 provides interfaces that supply information about large amounts of binary data stored in business software components 20. These interfaces are optional and used only when the number of instances of a business software component 20 is very large. For example, a group of logging measurements could be collected into a GPBLOB 3200 describing a section of a well log. As is well understood by those of ordinary skill in the programming arts, "BLOB" is an acronym for binary large object.

Figure 11:
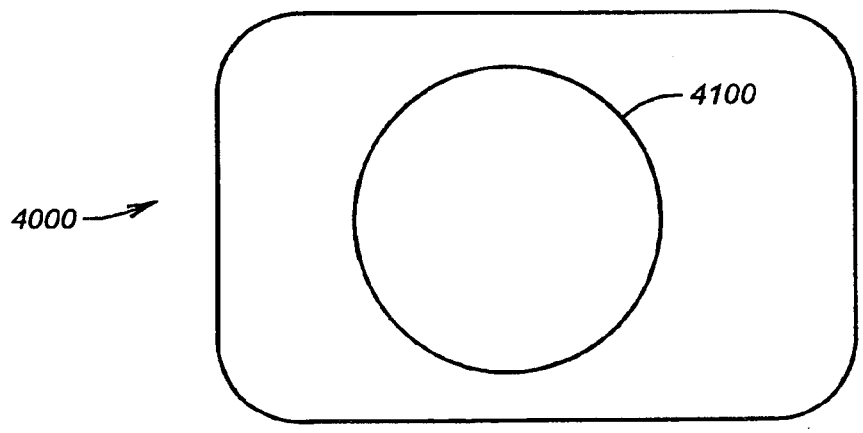
FIG. 11, a Venn-type diagram of the present invention's Real-Time Device tier.

Referring now to FIG. 11, Real-Time Device tier 4000 supports communication with and event handling for a real-time device, such as from a down-hole logging tool to a computer on a truck. Real-Time Device tier 4000 comprises GPRealTime 4100 to support standard communication and event-handling interfaces that allow a device to communicate with other connected software components 20, including interfaces to provide methods for allowing a user to register a real-time device with another real-time device.

Figure 12:
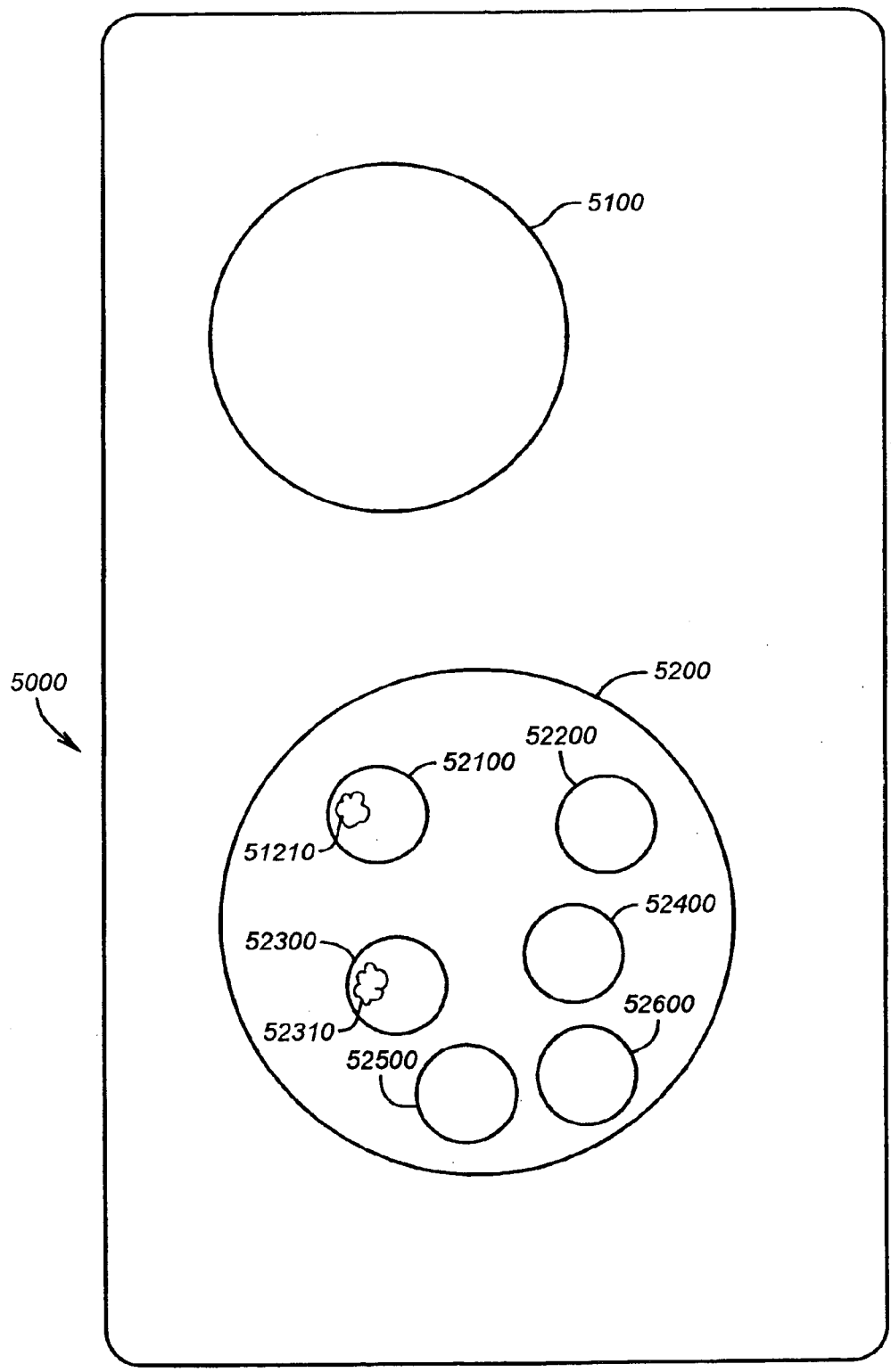
FIG. 12, a Venn-type diagram of the present invention's Data tier.

Referring now to FIG. 12, Data tier 5000 provides data persistence services for business software components 20. Data tier 5000 also provides access to data. Data tier 5000 comprises: GPPersist 5100, that lets data be written to and read from a data source, and GPDataAccess 5200, that provides access to specific types of data.

In a preferred embodiment, GPDataAccess 5200 comprises: GPDataFormat 52100, that provides business software component 20 persistence for a specific data format; GPDataService 52200, used to build software components 20 that hold a list of registered data formats available; GPWindowedIO 52300, that establishes the requirements for information a software component 20 is retrieving from a data service; GPDataIO 52400, used for low-level hardware device (e.g. disk and tape) input/output ("I/O") access; GPUnitsConverter( ) 52500, used for data conversion from one measurement system to another; and GPDataDictionary 52600, that provides data identity and naming conventions for information retrieved from a data file. It is important to note that, as exemplified by GPDataAccess 5200, a feature of the present invention's architecture allows a package such as GPDataAccess 5200 to comprise other packages such as GPDataFormat 52110.

In a preferred embodiment, GPWindowedIO 52300 specifies the requirements for information a software component 20 is retrieving from a data service. GPWindowedIO 52300 comprises IGCWindowedIO 52310 that specifies the requirements for information a software component 20 is retrieving from a data service. In a currently preferred embodiment, IGCWindowedIO 52310 comprises: OffsetFromCurrent 52311, this windowed I/O interval's offset from the main set's current working level data, if any; TopOffset 52312, the interval's top offset in levels from its current working level; BottomOffset 52313, the interval's bottom offset in levels from its current working level;

Increment 52314, the level spacing to return in the given interval; ResampleType 52315, describes the actions to perform when a level spacing of data sets does not match; TopBoundType 52316, indicates what happens to the data above the current working level, e.g. when a curve interval is iterated off the beginning/end of the data or over a NULL value; BottomBoundType 52317, indicates what happens to the data below the current working level, e.g. when a curve interval is iterated off the beginning/end of the data or over a NULL value; DataType 52318, the returned data type; and AccessType 52319, e.g. either random or sequential access.

In a preferred embodiment, GPDataIO 52400 specifies interfaces for low-level device (e.g., disk and tape) I/O access, GPUnitsConverter 52500 comprises interfaces used for data conversion from one measurement system to another, and GPDataDictionary 52600 comprises interfaces for components that provide data identity and naming conventions for information retrieved from a data file.

Figure 13:
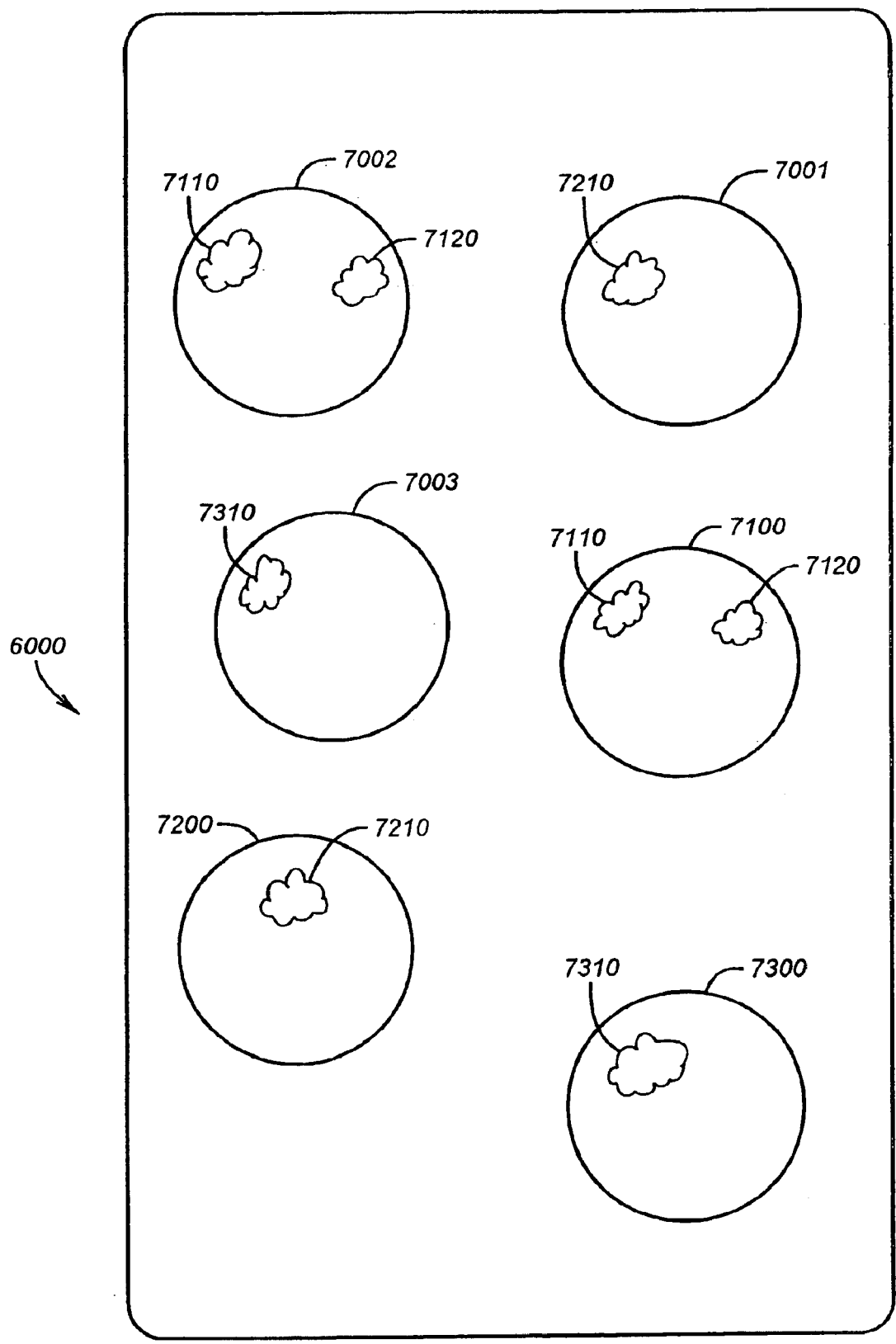
FIG. 13, a Venn-type diagram of the present invention's Processing tier.

Referring now to FIG. 13, software components 20 associated with Processing tier 6000 need to have interfaces specified by Processing tier 6000 but also need to be able to access business software components 20 through business software component 20 interfaces. Processing tier 6000 provides for the instantiation and control of a process flow (or process model), including algorithmic processing. Algorithmic processing follows patterns defined by GPProcessingObject 6200 with required interfaces.

Figure 14:
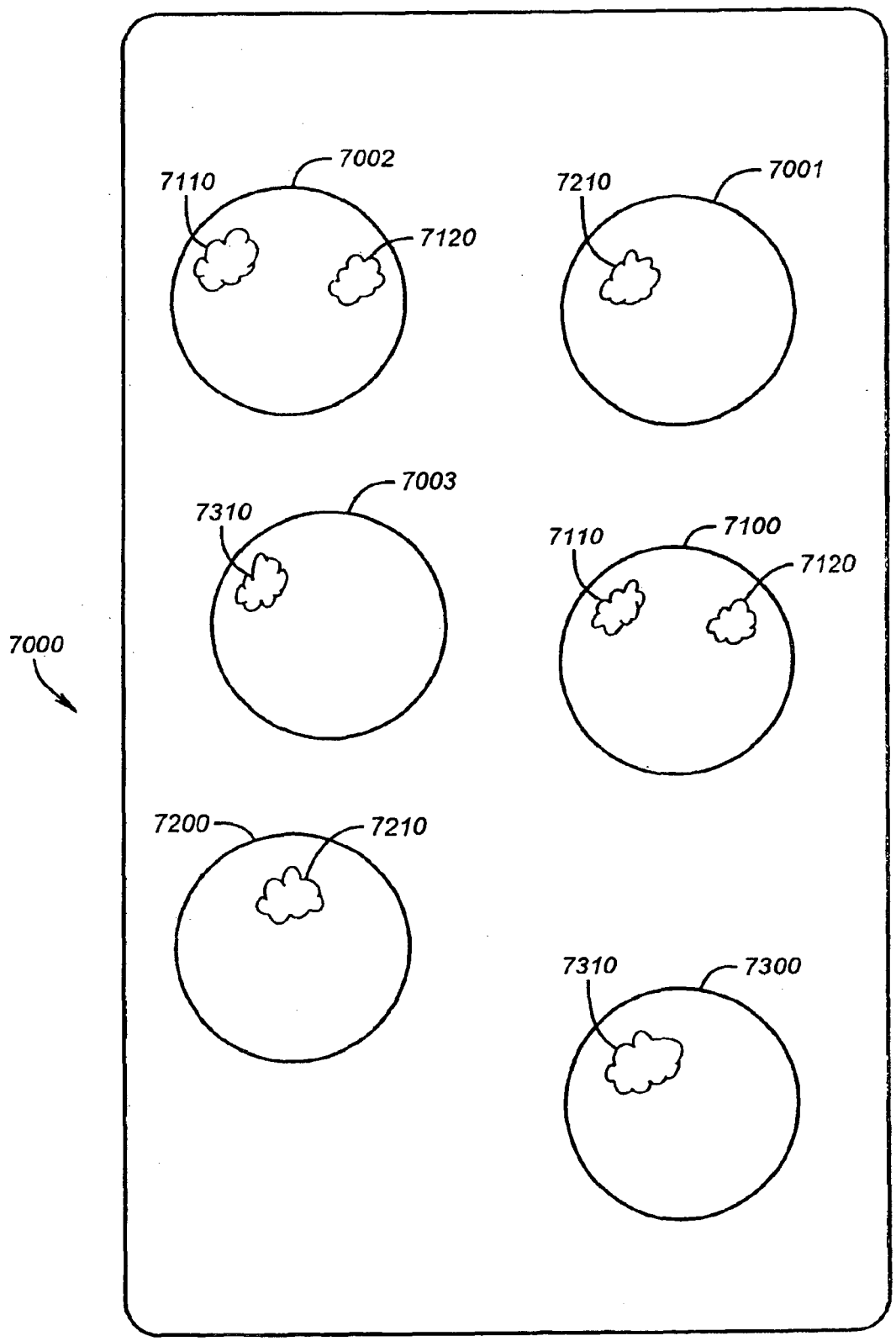
FIG. 14, a Venn-type diagram of the present invention's Visual tier.

Referring now to FIG. 14, Visual tier 7000 provides display of and user interaction with information. In a preferred embodiment, Visual tier 7000 architecture is based on a Model-View-Controller design pattern. A Visual tier 7000 visual software component 20 comprises visual model 7001 (identified by IGCViewModel 7210), view 7002 (typically a full ActiveX control which exposes IGCView 7110 and IGCBaseView 7120), and controller 7003 (identified by IGCViewController 7310). Visual model 7001, view 7002, and controller 7003 are connected using messaging such as from GPConnection 1300, GPMessage 2100, and GPEventHandler 1400, and each can have one or more message handlers attached to provide additional behavior. Additionally, visual software components 20 have a connection sink.

Figure 15:
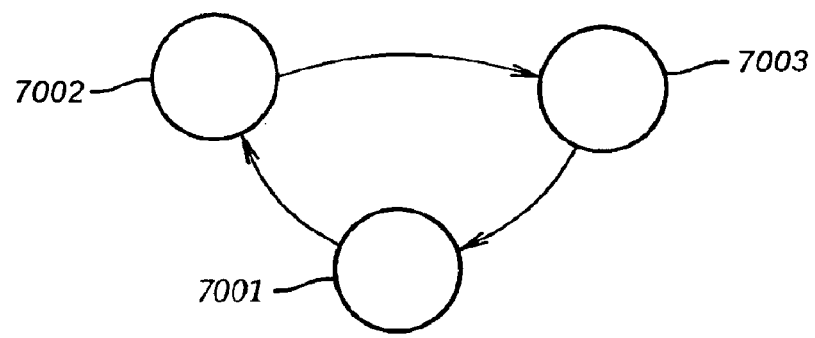
FIG. 15, a Venn-type diagram of the present invention's Model-View-Controller (MVC) design pattern.

Referring now to FIG. 15, the Model-View-Controller ("MVC") design pattern comprises three logical subcomponents: visual model 7001, view 7002, and controller 7003. Visual model 7001 contains data and computational logic. View 7002 presents visual model 7001, or a portion of it, to users. Controller 7003 handles user interaction, such as keystrokes and pointer device-generated inputs. The basic MVC design pattern is used by the present invention for Visual tier 7000 software components 20 such as log viewers or editors. Generally, a view 7002 must be associated with a visual model 7001 so that the visual model 7001 can notify the view 7002 that it needs to update itself. Visual model 7001 must have some sort of registration mechanism for views 7002 to use to request the update notices, and view 7002 must have an update mechanism for visual model 7001 to use.

A view 7002 will also be associated with a controller 7003. User interaction, initially captured by view 7002, is forwarded to controller 7003 for interpretation. Controller 7003 then notifies visual model 7001, if necessary, of any action that should be taken as a result of the interaction.

Figure 17:
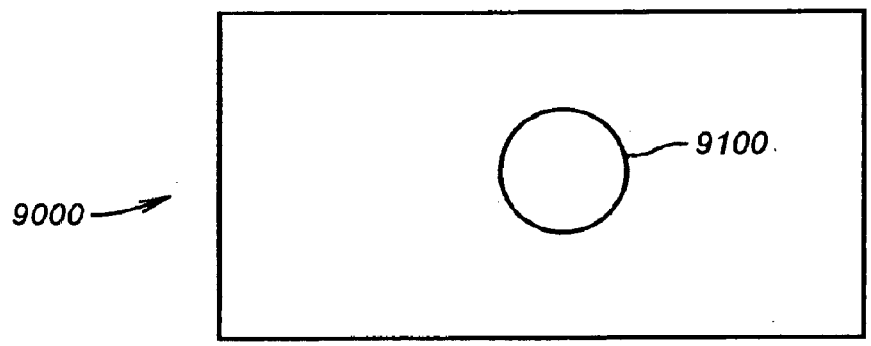
FIG. 17, a Venn-type diagram of the present invention's Business Rules tier.
Figure 18:
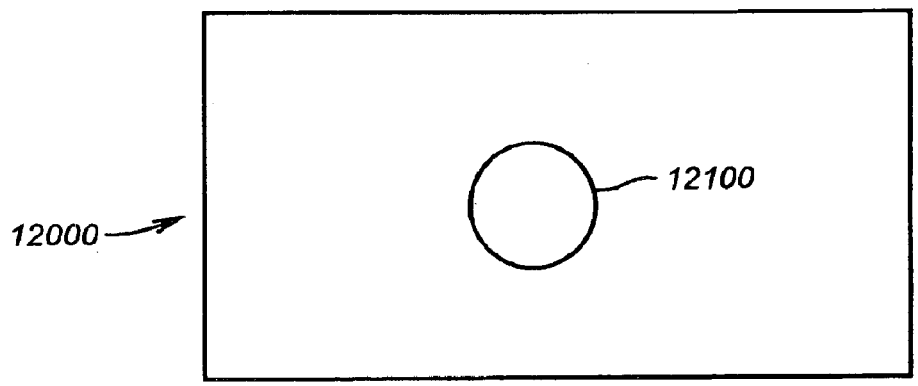
FIG. 18, a Venn-type diagram of the present invention's Interceptor tier.
Figure 16:
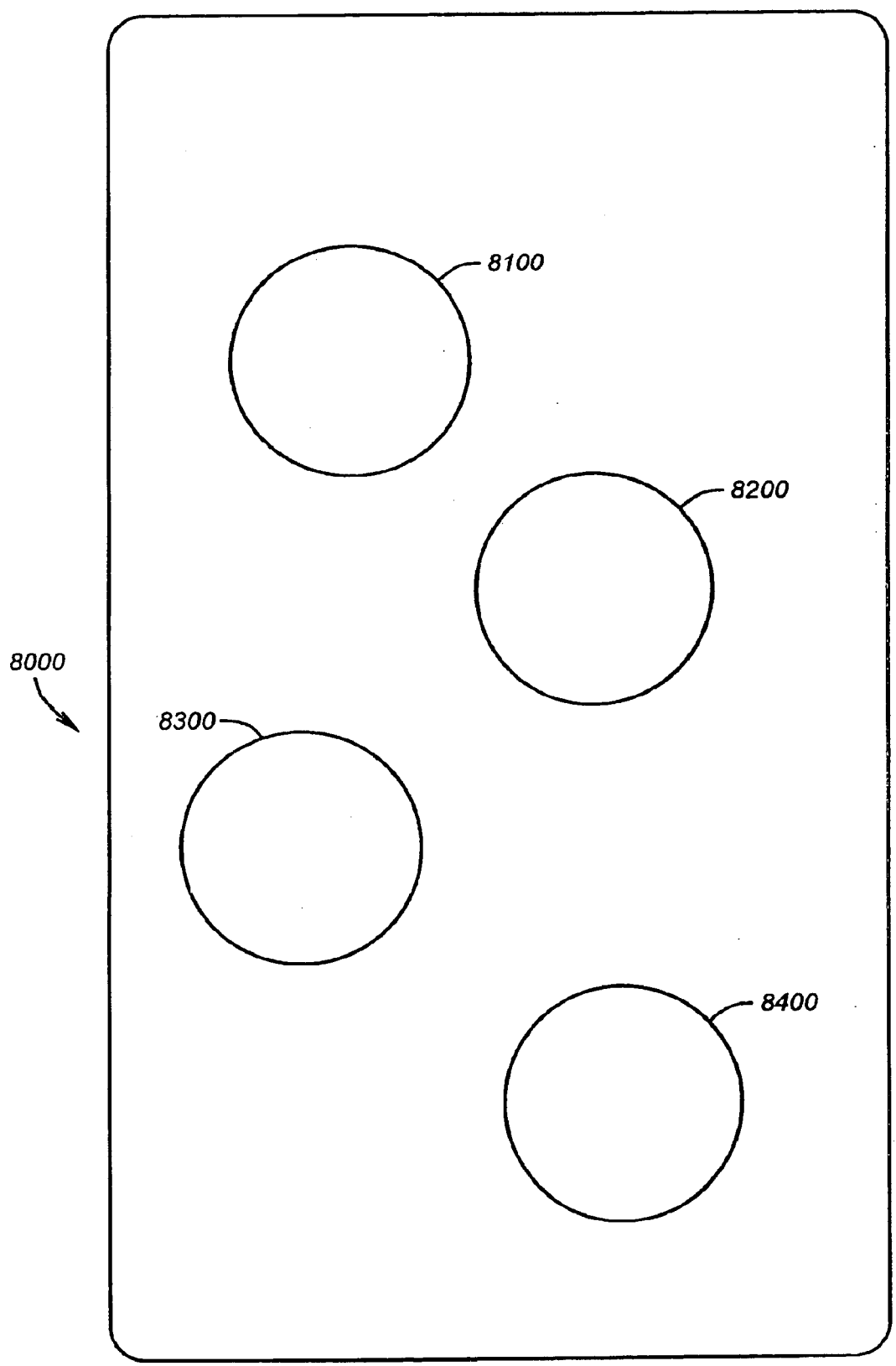
FIG. 16, a Venn-type diagram of the present invention's template objects.
Figure 19:
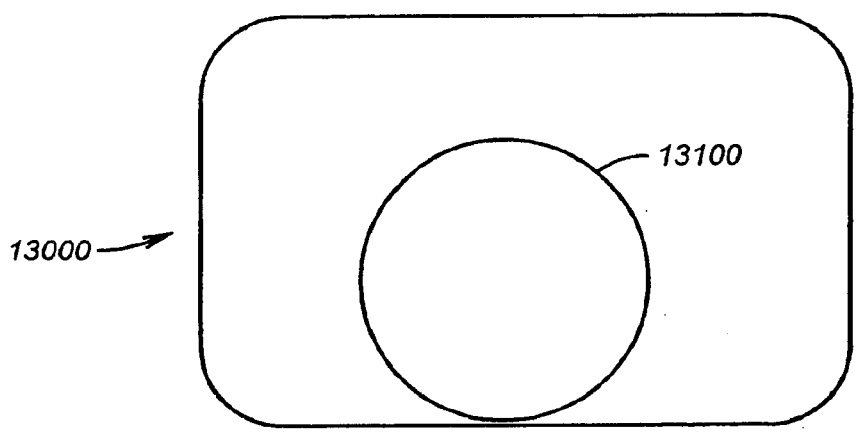
FIG. 19, a Venn-type diagram of the present invention's Application tier.
Figure 20:
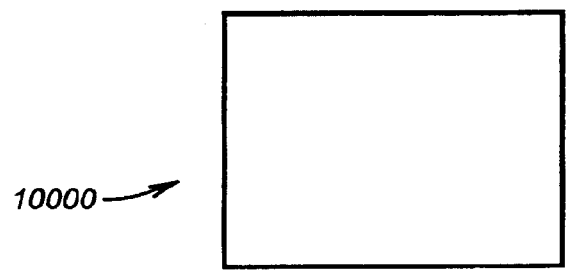
FIG. 20, a Venn-type diagram of the present invention's Wizards tier.
Figure 21:
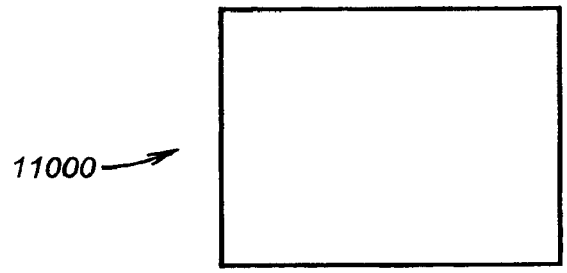
FIG. 21, a Venn-type diagram of the present invention's Testing tier.

Referring now to FIG. 17, Business Rules tier 9000 is used to facilitate use of business rules, which are conditions and tests to determine whether it is valid for one business software component 20 to have another business software component 20 added to its associations. For example, business rules may dictate that an oil field may have many wells associated with it, but a well may only be associated with one oil field. Business rules are also used to enforce cardinality.

Figure 22:
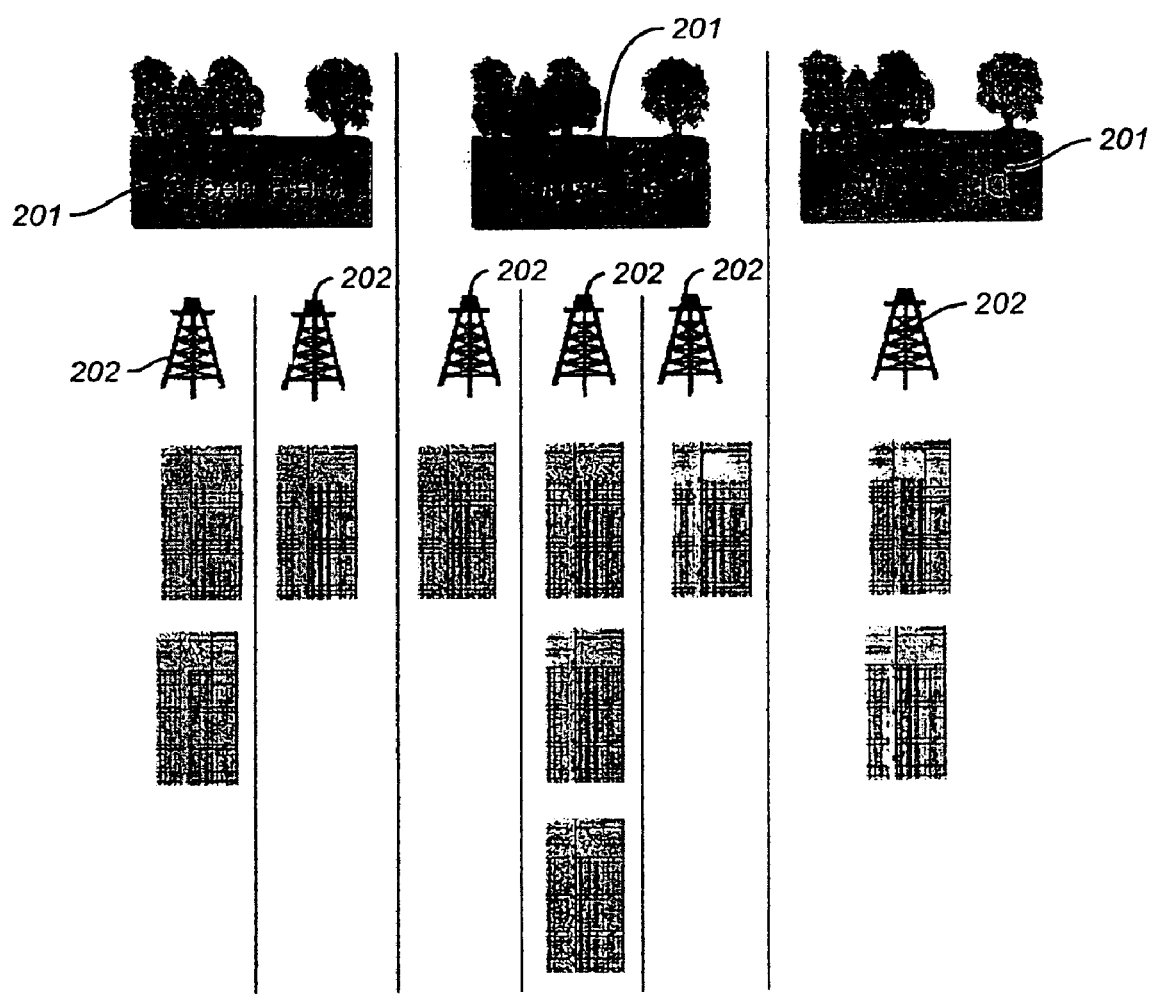
FIG. 22 is a representation of a simple business model consisting of an oil fields with two wells associated with the field.

Referring now to FIG. 22, a simplified business model, the present invention uses tiers 30 comprising software components 20 to create a business model 31 of a petroleum company, by way of example and not limitation a business model 31 of the exploration and production assets of a petroleum company.

Business model's 31 inventory 700 comprises one or more predefined software components 20 for elements in oil fields 201 owned by the company (field components 21), software components 20 for oil wells 202 (well components 22) associated with each oil field 201, and software components 20 for well data logs 203 (not shown in the Figures) (log components 23) associated with each oil well 202. It is understood by those of ordinary skill in the software arts that the field components 21, well components 22, and log components 23 can be preexisting components, new components created for model 31, or new components created or modified from a set of base software components 20.

Business model 31 could easily be extended, e.g. by adding software components 20 or by adding data such as curve data associated with each well data log 203 and information related to the run that produced each data log 203, for example, the service company used and date and time of the run. In this manner, a software application may be created and adapted to an oilfield business model, including adding and using software components useful for modeling exploration needs of a petroleum company, production assets of a petroleum company, or any combination thereof.

Figure 23:
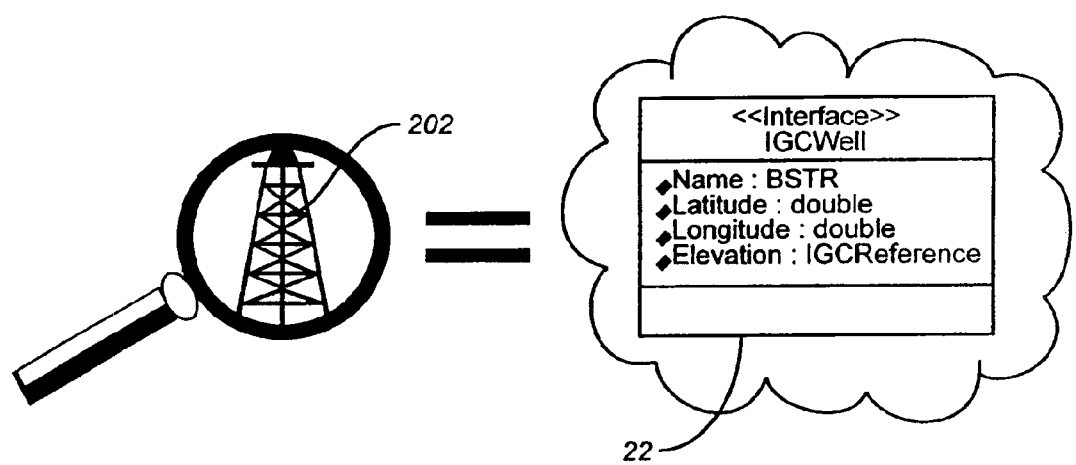
FIG. 23 is a representation of a structure for a well component.

Each software component 20—such as field components 21, well components 22, and log components 23—is wrapped by an interface as specified by the present invention and its related applications. For example, as shown in FIG. 23, with respect to the properties that uniquely characterize a software component 20 as a well software component 22, no other software component 20 in the system will have this same set of properties.

In addition, well software components 22 have properties to enable identifying the well software component 22 uniquely both by name and relationship, e.g. to the earth. In a preferred embodiment, while the name, latitude, and longitude properties may be either character strings or numbers assigned to oil well 202, elevation is defined by the value assigned to a specific well software component 22 interface.

Figure 24:
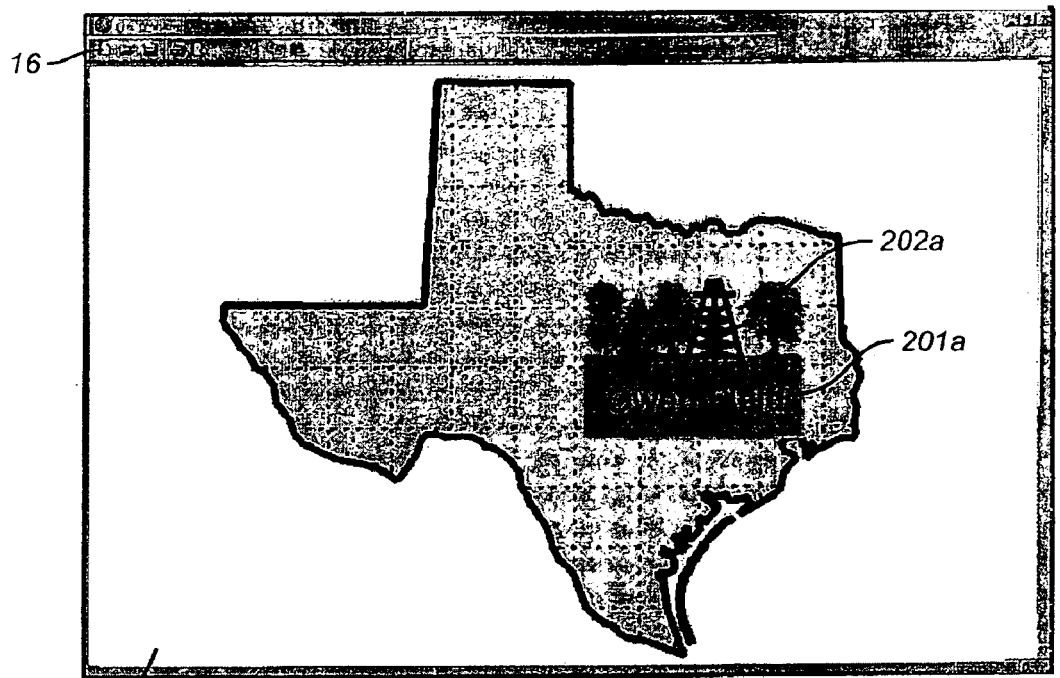
FIG. 24 is a representation of an exemplary display screen from an exemplary application.

Referring now to FIG. 24, the application whose display is illustrated in FIG. 24 is a business model viewer, in the preferred embodiment using Visual tier 30. Upon receiving a query from a user, e.g. a user seated at a keyboard, view 7002 searches the appropriate data repositories, e.g. an SQL database and/or a DLIS tape, and returns the query results to the user's screen 15 for viewing.

In the preferred embodiment, Visual tier 30 allows a user to see details of any business model 31, such as the one in FIG. 24. In this example, access to model 31 is limited by controller 7003 in Visual tier 30 which uses a model-view-controller paradigm. Access via controller 7003 may be configurable, i.e. controller 7003 may be read-only or any other permissions based on programmatic control. For example, in an alternative embodiment, controller 7003 allows a user to edit business model 31 as well as view it.

This type of functionality allows shipment of the same application to customers with multiple needs, resource levels, or levels of security. For example, a customer that only needs a model viewer purchases the application with controller 7003 in a read-only mode, whereas a customer that wants to edit models 31 as well as view them purchases the application with a controller 7003 capable of both viewing and editing. A customer could even purchase the application with both controllers 7003, allowing some users access to the read-only controller 7003 while others would have access to the view and edit controller 7003.

In the operation of a preferred embodiment, referring still to FIG. 24, requirements for an application for oil field 201 are first determined in accordance with the method of building an N-tier application of the present invention and co-pending U.S. patent application Ser. No. 09/746,157. Software components 20 obtained, created, and/or purchased to implement the functionality required to satisfy the requirements for oil field 201. These software components 20 are then associated with tiers 30, and an application generated to implement the functionality required to satisfy the requirements for oil field 201.

Once implemented, a user may then interact as needed with the application.

By way of example and not limitation, in a currently preferred embodiment a business model 31 begins by a user accessing screen 15 to display one or more representations 201a of oil field 201 showing one well representation 202a where screen 15 display is handled by a Visual tier 30 software component 20. The user may request operations and interact with the system via an input device such as a keyboard, light pen, touch pad, touch screen, mouse, voice control, joystick, track ball, or other similar means, or any combination thereof, all of which are familiar to those of ordinary skill in the computer art. Screen 15 may display representations of any predetermined type such as iconographical, pictorial, textual, or the like, or any combination thereof. The display and interaction methods and procedures are handled by visual model 7001, view 7002, and controller 7003 software components 20.

From main menu 16 presented by a field view 7002 software component 20, the user may have several options as will be apparent to those of ordinary skill in the programming arts. It will be apparent to a software programmer of ordinary skill in the art that main menu 16 may take many forms. A user may select an option to view a field, using any one of numerous techniques as will be apparent to those of ordinary skill in the programming arts including drop-down menus, keyboard shortcuts, icons, screen regions, macros, menu selections, mouse selections, touch panel screen selections, and the like, or any combination thereof. By way of example and not limitation, a user may select "File" from main menu 16, and then "Open Field" from a submenu to display the field the user wants to view and/or modify. In similar fashion, a user may select an option to make all or a subset of viewable fields visible. These will all be under the control of controller 7003, view 7002, and visual model 7001.

Figure 25:
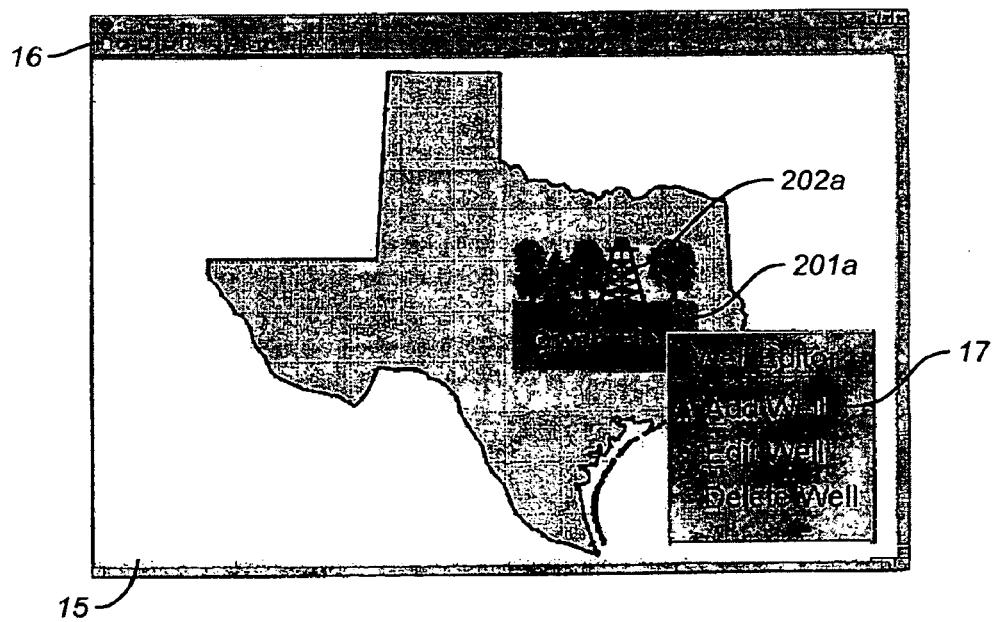
FIG. 25 is a representation of a further exemplary display from the exemplary application.

Referring now to FIG. 25, numerous techniques exist to further manipulate oil fields 201 as will be apparent to those of ordinary skill in the programming arts including drop-down menus, keyboard shortcuts, macros, menu selections, mouse selections, touch panel screen selections, and the like, or any combination thereof. By way of example and not limitation, a user may position a mouse cursor over representation 201a and select representation 201a to invoke Well Editor menu 17, e.g. by left or right mouse button click or other mouse selection means such as tapping the mouse. Once Well Editor menu 17 is invoked, a user can select a predetermined option, such as by selecting Add Well, by any programmatic means available, such as by way of example and not limitation left-click or right-click of a mouse whose cursor is position appropriately on the representation 201a to spot the location of the a new oil well representation 201a on the map.

Figure 26:
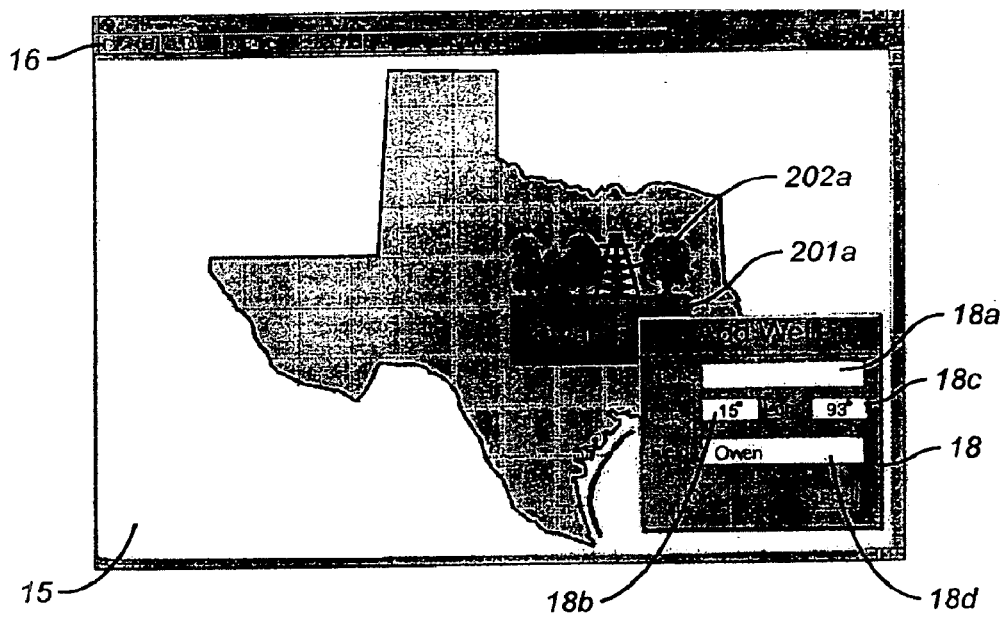
FIG. 26 is a representation of a further exemplary display from the exemplary application.

Referring now to FIG. 26, the application may then provide an opportunity to add field name 18a, latitude 18b, and longitude 18c of the new well such as by Add Well 18 dialog display. These data will be communicated back to a software component 20 for inclusion.

Figure 27:
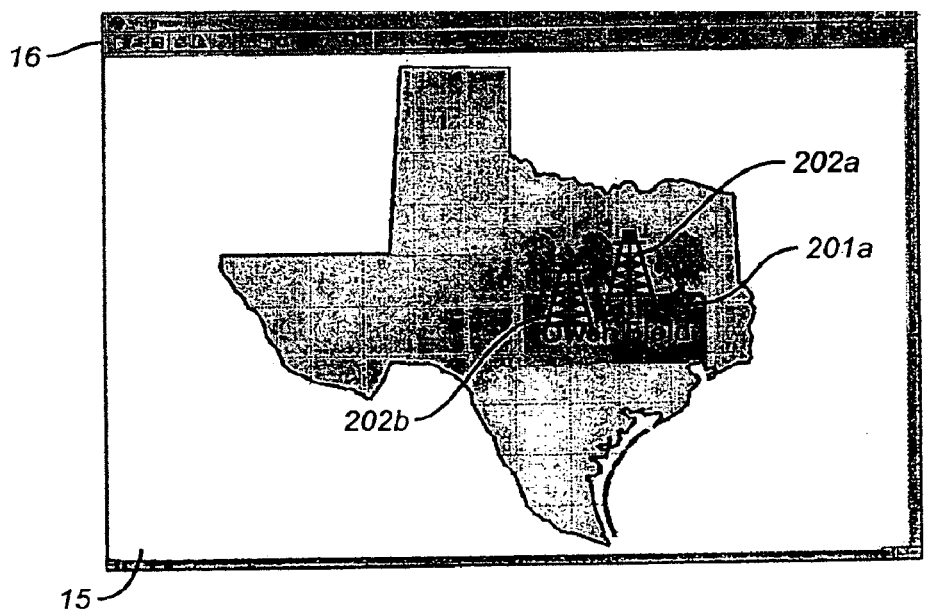
FIG. 27 is a representation of a further exemplary display from the exemplary application.

Referring now to FIG. 27, in this manner, new well 202b may be created on the fly, new well 202b being associated with a respective tier 30.

Similarly, users can create new field components 21, well components 22, log components 23, and the like, or even create new tiers 30 such as a new field tier 30 without the need to recreate the software application responding to the user's or program's requests. It is understood by those of ordinary skill in the software programming arts that such extensibility can be programmed to occur automatically given some triggering event such as a trigger external to the application as well as prevented altogether.

Figure 28:
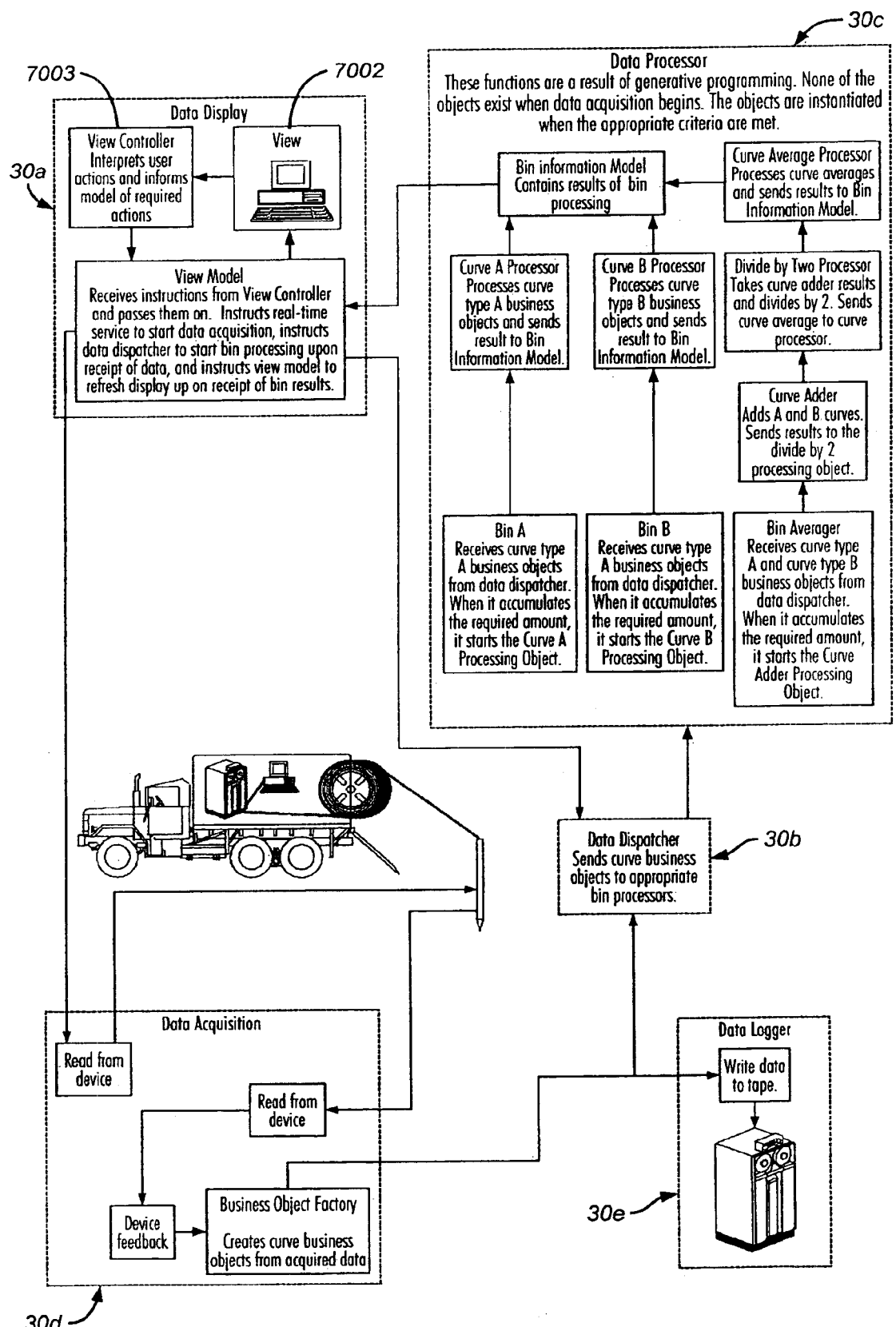
FIG. 28 is a block diagram of the processing occurring when adding a new well to the field in the exemplary application.

Referring now to FIG. 28, On-the-Fly: An Example of Generative Programming, a set of curve data are accumulated as they are acquired from oil well 201. Five tiers 30 are shown in FIG. 28, but this is not to imply that the application will be limited to these tiers 30.

Data display tier 30a is a Visual tier 7000 and is responsible for interpreting user input actions and presenting visual representations and information. Within data display tier 30a, controller 7003 interprets user actions and informs view model 7001 of required actions. View model 7001 receives instructions from controller 7003 and processes them, such as by passing the instructions on to another one or more software components 20. These may include data acquisition tier 30a real-time services, data dispatcher tier 30b services, and view 7002 services.

Data processing tier 30c comprises dynamically created software components instantiated from software components 20 in inventory 700 that adhere to framework 40 of data processing tier 30c. By way of example and not limitation, these software components 20 in data processing tier 30c may accumulate and otherwise processes raw data fed to data processing tier 30c by data acquisition tier 30d.

Data acquisition tier 30d comprises one or more software components 20 modeling or otherwise representing real-world entities such as pumps, tools, valves, and the like. These software components 20 of data acquisition tier 30d may be initialized by user control, programmatically, or any combination thereof. Additionally, one or more data software components 20 may accumulate data and/or interface between a real-world device and a logging device. The accumulated data may accumulate at the well site, in one or more buffers in communication with oil well 201 and the application, within the application, or any combination thereof.

When a predetermined number of curve data are acquired, processing software components 20 are generated under programmatic control and perform the required processing on those data. In this example, most of the functionality in data processor 30c is created on-the-fly, meaning that none of processing software components 20 exists until the receipt of a predefined amount of data launch them.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A system for developing a software application for manipulating data associated with an asset, comprising:
   at least one processing unit;
   at least one memory store operatively connected to the processing unit;
   extensible N-tier software resident in and executable within the at least one processing unit; wherein N corresponds to a positive integer value;
   an inventory of software components resident in the memory store wherein a plurality of tiers are generated from the inventory of software components using the N-tier software, each tier being associated with at least one other tier, and each tier comprising a plurality of software components and performing a predetermined function relating to an asset, each software component comprising a software object;
   an input device operatively in communication with the processing unit; and
   an output device operatively in communication with the processing unit.

2. The system of claim 1 wherein at least one software component represents one of an oil field component, an oil well component, and an oil well log component.

3. The system of claim 1 wherein the output device is responsive to inputs from the input device, the N-tier software, and an application generated using the N-tier software, or a combination thereof.

4. The system of claim 1 wherein additional software components are developed or modified manually by user input, or automatically by an application generated using the N-tier software in response to at least one internal trigger, or automatically by an application generated using the N-tier software in response to at least one external trigger, or a combination thereof.

5. The system of claim 1, wherein the asset comprises an asset of a petroleum company.

6. A method for developing a software application to manipulate data associated with a selected set of assets, comprising:
   selecting a first software component from an inventory of software components to perform a first function relating to a selected set of assets;
   selecting a second software component from outside the inventory of software components to perform a second function;
   defining a plurality of tiers generated from at least the inventory of software components, each tier being associated with at least one other tier, each tier comprising a plurality of the software components and performing a predetermined function, each software component comprising a software object, the first software component being assigned to a first tier and the second software component being assigned to either the first tier or a second tier;
   defining the sequencing of the first and second the software components in order to manipulate data associated with the selected set of assets.

7. The method of claim 6 further comprising:
   selecting a well component from the inventory of software components to selectively represent requirements for a predetermined number of wells;
   selecting a log component from the inventory of software components to selectively represent requirements for a predetermined number of log components;
   selecting a field component from the inventory of software components to selectively represent requirements for a predetermined number of fields; and
   associating the well component with the log component and the field component.

8. The method of claim 6 further comprising providing each software component with a change menu wherein the change menu is manually accessed, programmatically accessed, or a combination thereof.

9. The method of claim 6 further comprising developing one or more software components to process data wherein the processing software components are created under programmatic control and process the data upon receipt of a predefined amount of data.

10. The method of claim 6 wherein the software components are distributed among the plurality of processing units.

11. An article of manufacture, comprising:
    a computer storage medium having a computer program encoded therein for developing a software application to manipulate data associated with a selected set of assets, the computer storage medium including:
    code for selecting a first software component from an inventory of software components to perform a first function relating to the set of assets;
    code for selecting a second software component from outside the inventory to perform a second function;
    code for defining a plurality of tiers from the inventory of software components, each tier being associated with at least one other tier, each tier comprising a plurality of the software components and performing a predetermined function, each software component comprising a software object, the first software component being assigned to a tier and the second software component being assigned to a tier; and
    code for defining the sequencing of the first and second software components in order to manipulate data associated with the set of assets.

12. The article of manufacture of claim 11 wherein the set of assets comprises a set of physical assets.

13. The article of manufacture of claim 12 wherein the physical assets comprise at least one of an oil well and an oil field.

* * * * *